(12) United States Patent
Kunishige et al.

(10) Patent No.: US 8,934,033 B2
(45) Date of Patent: Jan. 13, 2015

(54) IMAGING DEVICE, IMAGING METHOD, AND COMPUTER READABLE RECORDING MEDIUM

(75) Inventors: Keiji Kunishige, Hachioji (JP); Manabu Ichikawa, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 225 days.

(21) Appl. No.: 13/613,577

(22) Filed: Sep. 13, 2012

(65) Prior Publication Data

US 2013/0088618 A1    Apr. 11, 2013

(30) Foreign Application Priority Data

Oct. 6, 2011    (JP) ................................ 2011-222360

(51) Int. Cl.
*H04N 5/262*    (2006.01)
*H04N 5/232*    (2006.01)

(52) U.S. Cl.
CPC ....... *H04N 5/23216* (2013.01); *H04N 5/23245* (2013.01); *H04N 5/23293* (2013.01)
USPC ...................................................... 348/239

(58) Field of Classification Search
CPC .................................................... H04N 5/262
USPC ....................................................... 348/239
See application file for complete search history.

(56) References Cited

U.S. PATENT DOCUMENTS

| 6,546,187 B1 * | 4/2003 | Miyazaki et al. .............. 386/224 |
| 6,680,749 B1 * | 1/2004 | Anderson et al. ........ 348/231.99 |
| 2010/0238324 A1 * | 9/2010 | Toyoda ......................... 348/239 |

FOREIGN PATENT DOCUMENTS

| JP | 2008-211843 | 9/2008 |
| JP | 2010-219905 | 9/2010 |

* cited by examiner

*Primary Examiner* — James Hannett
(74) *Attorney, Agent, or Firm* — John C. Pokotylo; Straub & Pokotylo

(57) ABSTRACT

Provided is an imaging device including an image processing unit that executes artistic effect processing of applying an artistic effect causing a visual effect to image data by a combination of a plurality of image processing, and executes moving image special effect processing of applying a moving image special effect causing a visual effect over frames, a moving image special effect start signal input unit that receives an input of a moving image special effect start signal instructing a start of the moving image special effect processing in the image processing unit, and an image processing control unit that switches artistic effect processing to be executed by the image processing unit in response to the input of the moving image special effect start signal when plural kinds of processing remain set as artistic effect processing performed by the image processing unit.

6 Claims, 20 Drawing Sheets

FIG.3

| NAME | CHROMA | GAMMA | VISUAL EFFECT |
|---|---|---|---|
| POP ART | HIGH CHROMA | GAMMA ENHANCING CONTRAST | NOTHING |
| FANTASIC FOCUS | STANDARD | GAMMA CAUSING INTERMEDIATE BRIGHTNESS TO BE BRIGHTER | SOFT FOCUS |
| DIORAMA | HIGH CHROMA | GAMMA ENHANCING CONTRAST | PERIPHERAL GRADATION |
| TOY PHOTO | STANDARD | STANDARD | SHADING |
| ROUGH MONOCHROME | MONOCHROME | GAMMA ENHANCING CONTRAST | NOISE ADDITION |

TIME FROM TRIGGER

FIG.10

| BUTTON | DURING MOVING IMAGE NON-RECORDING | DURING MOVING IMAGE RECORDING |
|---|---|---|
| ↑ (UP-ARROW KEY) | EXPOSURE CORRECTION | ONE-SHOT ECHO START |
| ↓ (DOWN-ARROW KEY) | CONTINUOUS SHOOTING/ SINGLE SHOOTING | TRANSIT START |
| ← (LEFT-ARROW KEY) | AF TARGET | MULTIECHO START/STOP |
| → (RIGHT-ARROW KEY) | FLASH SETTING | FLUCTUATION START |

FIG.27

| BUTTON | DURING MOVING IMAGE NON-RECORDING | DURING MOVING IMAGE RECORDING |
|---|---|---|
| ↑ (UP-ARROW KEY) | EXPOSURE CORRECTION | EFFECT SIMULATION START |
| ↓ (DOWN-ARROW KEY) | CONTINUOUS SHOOTING/ SINGLE SHOOTING | EFFECT STOP (MULTI ECHO AND FLUCTUATION) |
| ← (LEFT-ARROW KEY) | AF TARGET | EFFECT SWITCHING |
| → (RIGHT-ARROW KEY) | FLASH SETTING | EFFECT SWITCHING |
| DECISION BUTTON | CAMERA SETTING | EFFECT RECORDING START |
| RELEASE BUTTON (FIRST RELEASE) | AE/AF | EFFECT RECORDING START |
| RELEASE BUTTON (SECOND RELEASE) | SHOOTING | EFFECT RECORDING START |

FIG.28

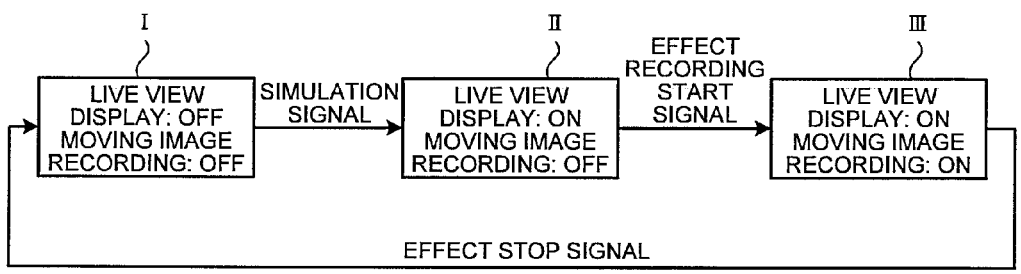

IMAGING DEVICE, IMAGING METHOD, AND COMPUTER READABLE RECORDING MEDIUM

CROSS-REFERENCE TO RELATED APPLICATIONS

This application is based upon and claims the benefit of priority from Japanese Patent Application No. 2011-222360, filed on Oct. 6, 2011, the entire contents of which are incorporated herein by reference.

BACKGROUND OF THE INVENTION

1. Field of the Invention

The present invention relates to an imaging device that images a subject and generates image data of the subject, an imaging method, and a computer readable recording medium.

2. Description of the Related Art

In recent years, imaging devices such as digital cameras have been known that have not only a function of generating a clear image with a natural impression but also a function of executing a plurality of image processing and intentionally adding a visual special effect such as noise, shading, and gradation. The imaging device having the above-mentioned functions can perform shooting giving a special impression which has not been provided in the past.

For example, Japanese Laid-open Patent Publication No. 2008-211843 discloses a technique related to a user interface in which when a user sets an operation mode of an imaging device, images which have been subjected to different kinds of image processing are displayed through a multi-screen display so that the user can easily make a selection.

Further, Japanese Laid-open Patent Publication No. 2010-219905 discloses a technique by which a display is performed while automatically switching images which have been subjected to special image processing in time series.

SUMMARY OF THE INVENTION

An imaging device according to the present invention captures a subject, generates image data of the subject, and captures a moving image and a still image, the device including: an image processing unit that executes artistic effect processing of applying an artistic effect causing a visual effect to the image data by a combination of a plurality of image processing, and executes moving image special effect processing of applying a moving image special effect causing a visual effect over a plurality of frames; a moving image special effect start signal input unit that receives an input of a moving image special effect start signal instructing a start of the moving image special effect processing in the image processing unit; and an image processing control unit that switches artistic effect processing to be executed by the image processing unit in response to the input of the moving image special effect start signal when a plurality of kinds of processing remain set as artistic effect processing performed by the image processing unit.

An imaging method according to the present invention is performed by an imaging device that captures a subject, generates image data of the subject, and captures a moving image and a still image, the method including: in a state in which a plurality of kinds of processing remain set as artistic effect processing causing a visual effect by a combination of a plurality of imaging processing, when an input of a moving image special effect start signal used to start moving image special effect processing applying a moving image special effect causing a visual effect over a plurality of frames is input during execution of any one of the plurality of kinds of artistic effect processing, switching artistic effect processing which is being executed to another artistic effect processing included in the plurality of kinds of processing.

A non-transitory computer-readable recording medium according to the present invention has recorded an executable program thereon, the program instructing a processor to execute: in a state in which a plurality of kinds of processing remain set as artistic effect processing causing a visual effect by a combination of a plurality of imaging processing, when an input of a moving image special effect start signal used to start moving image special effect processing applying a moving image special effect causing a visual effect over a plurality of frames is input during execution of any one of the plurality of kinds of artistic effect processing, switching artistic effect processing which is being executed to another artistic effect processing included in the plurality of kinds of processing.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a diagram illustrating an outline of artistic effect processing performed by an artistic effect image processing unit of the imaging device according to the first embodiment of the present invention;

FIG. 10 is a diagram illustrating an example of assigning an operation to each arrow key of a cross key at the time of moving image recording and at the item of moving image non-recording;

FIG. 27 is a diagram illustrating an assignment of a user interface in the imaging device according to the second embodiment of the present invention; and FIG. 28 is a diagram illustrating an outline of a state transition at the time of moving image recording in the imaging device according to the second embodiment of the present invention.

DETAILED DESCRIPTION OF THE PREFERRED EMBODIMENTS

Figure 1:
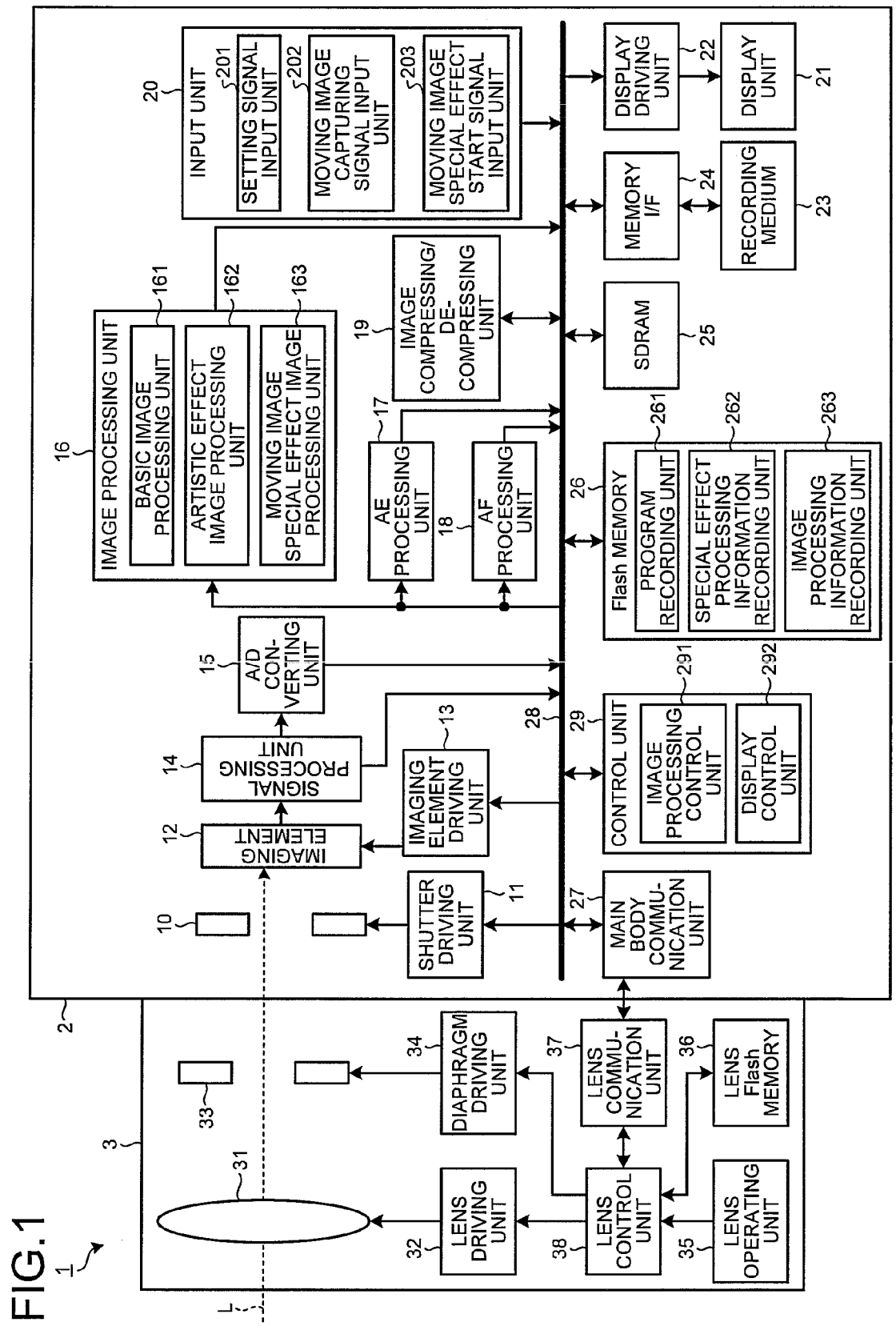
FIG. 1 is a block diagram illustrating a configuration of an imaging device according to a first embodiment of the present invention.

Hereinafter, embodiments (hereinafter, referred to as an "embodiment") for embodying the present invention will be described with reference to the accompanying drawings. In the drawings, like reference numerals denote like parts.

First Embodiment

In a first embodiment of the present invention, when moving image recording starts using an imaging device having a still image capturing function and a moving image capturing function, a function of a user interface for an operation input assigned for a still image is switched to a function for a moving image special effect.

The imaging device of the first embodiment has a function of capturing a still image during moving image capturing. Here, examples of a method of capturing a still image during moving image capturing include a method of capturing a still image in the process of capturing a moving image and a method of capturing a still image directly after moving image capturing ends. Further, examples of the method of capturing a still image in the process of capturing a moving image includes a method of stopping moving image capturing and then performing still image capturing and a method of performing still image capturing and moving image capturing at the same time.

Figure 2:
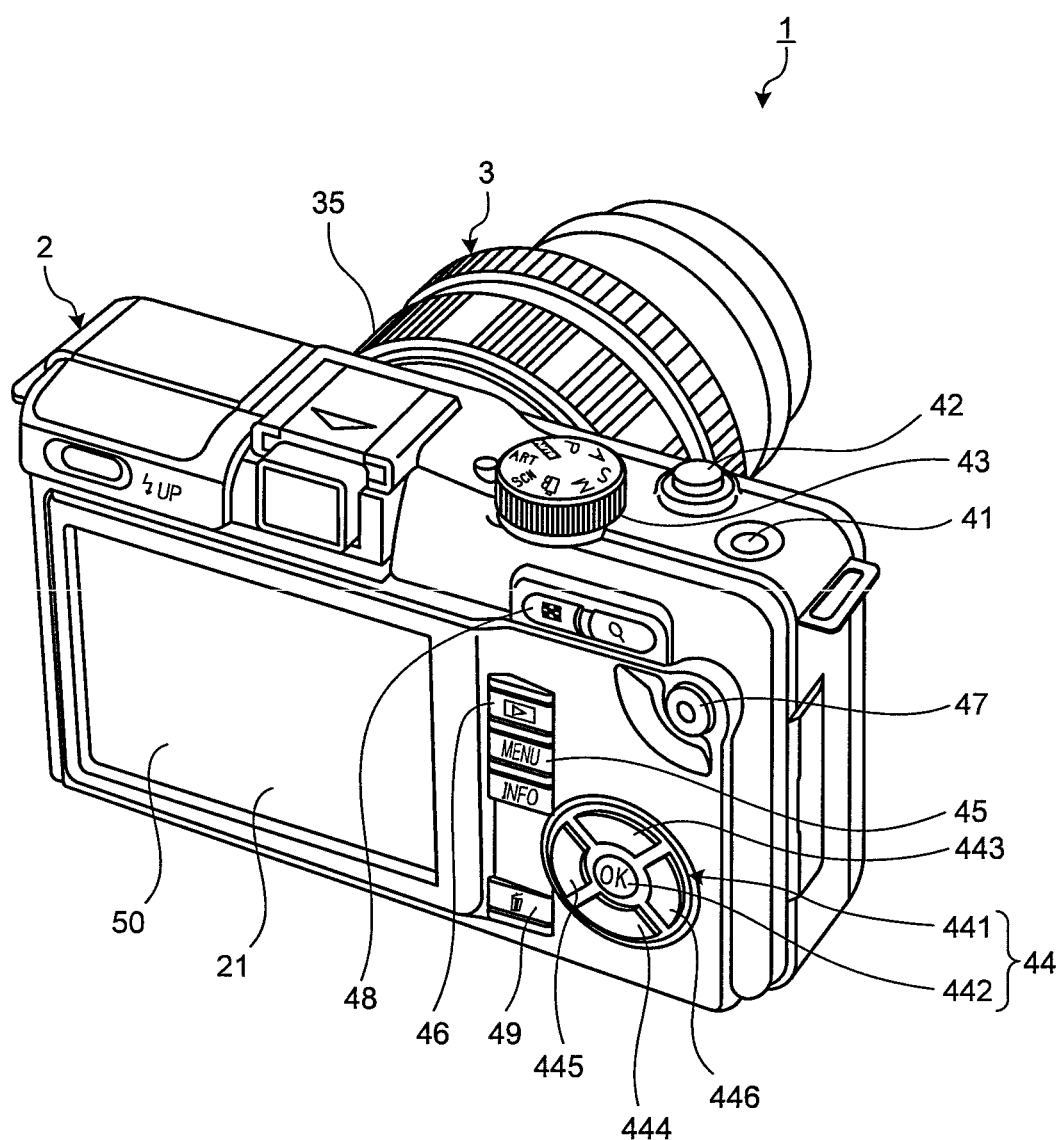
FIG. 2 is a perspective view illustrating a configuration of the imaging device according to the first embodiment of the present invention, which is viewed at a side (front side) facing a user.

FIG. 1 is a block diagram illustrating a configuration of the imaging device of the first embodiment. FIG. 2 is a perspective view illustrating a configuration of the imaging device according to the first embodiment of the present invention, which is viewed at a side (front side) facing the user. An imaging device 1 illustrated in FIGS. 1 and 2 includes a main body unit 2 and a lens unit 3 detachably attached to the main body unit 2.

The main body unit 2 includes a shutter 10, a shutter driving unit 11, an imaging element 12, an imaging element driving unit 13, a signal processing unit 14, an A/D (analog-to-digital) converting unit 15, an image processing unit 16, an AE (automatic exposure) processing unit 17, an AF (auto-focus) processing unit 18, an image compressing/decompressing unit 19, an input unit 20, a display unit 21, a display driving unit 22, a recording medium 23, a memory I/F 24, an SDRAM (Synchronous Dynamic Random Access Memory) 25, a flash memory 26, a main body communication unit 27, a bus 28, and a control unit 29.

The shutter 10 causes a state of the imaging element 12 to be set to an exposure state or a light-blocking state. The shutter driving unit 11 is configured using a stepping motor or the like, and drives the shutter 10 in response to an instruction signal input from the control unit 29.

The imaging element 12 is configured, for example, using a CCD (Charge Coupled Device) or a CMOS (Complementary Metal Oxide Semiconductor) that receives light condensed by the lens unit 3 and converts the light into an electric signal. The imaging element driving unit 13 causes the imaging element 12 to output image data (an analog signal) to the signal processing unit 14 at a predetermined timing. In this context, the imaging element driving unit 13 functions as an electronic shutter.

The signal processing unit 14 executes analog processing on the analog signal input from the imaging element 12, and outputs a resultant signal to the A/D converting unit 15. Specifically, the signal processing unit 14 performs noise reduction processing, gain-up processing, and the like on the analog signal. For example, the signal processing unit 14 reduces reset noise and the like from the analog signal, performs waveform shaping, and then performs gain-up processing to cause brightness to reach to a target level.

The A/D converting unit 15 generates digital image data by performing A/D conversion on the analog signal input from the signal processing unit 14, and outputs the digital image data to the SDRAM 25 through the bus 28.

The image processing unit 16 acquires image data from the SDRAM 25 through the bus 28, performs various kinds of image processing on the acquired image data (RAW data), and generates processed image data. The processed image data is output to the SDRAM 25 through the bus 28. The image processing unit 16 includes a basic image processing unit 161, an artistic effect image processing unit 162, and a moving image special effect image processing unit 163.

The basic image processing unit 161 performs basic image processing including at least optical black subtraction processing, white balance (WB) adjustment processing, synchronization processing of image data when an imaging element has the Bayer array, color matrix calculation processing, gamma correction processing, color reproduction processing, and edge enhancement processing on image data. Further, the basic image processing unit 161 performs finish effect processing of reproducing a natural image based on previously set parameters of respective image processing, and so generates finish effect image data. For example, the finish effect processing includes natural processing which is processing of finishing an image in a natural tone, vivid processing which is processing of finishing an image vividly, flat processing which is processing of finishing with the emphasis on a material property of a subject, and monotone processing which is processing of finishing an image in a monochrome tone. Here, examples of the parameters of the respective image processing include a contrast value, a sharpness value, a chroma value, a white balance value, and a gradation value.

The artistic effect image processing unit 162 performs artistic effect processing of causing a visual effect by combining a plurality of image processing on single image data, and so generates processed image data (hereinafter, referred to as "artistic effect image data").

FIG. 3 is a diagram illustrating an outline of artistic effect processing performed by the artistic effect image processing unit 162. In FIG. 3, five kinds of processing, that is, pop art, fantasic focus, diorama, toy photo, and rough monochrome are described as artistic effect processing. Each artistic effect processing described above will be described below.

The pop art is processing of enhancing a color to be colorful and rendering a bright and pleasant atmosphere. For example, the pop art is implemented by a combination of chroma enhancement processing and contrast enhancement processing. Overall, an effect of a high contrast and a high chroma is given.

The fantasic focus is processing of executing gradation processing on an entire image and giving an effect of a soft focus of synthesizing a resultant image with a non-gradated image at a predetermined ratio. In the fantasic focus, tone curve processing of causing intermediate brightness to be brighter is performed, and thus an image of a beautiful and fantasic atmosphere appearing to be surrounded by happy light is formed or generated while leaving a detail of a subject in soft tone. For example, the fantasic focus is implemented by a combination of image processing such as tone curve processing, gradation processing, alpha blending processing, and image synthesis processing.

The diorama is processing of gradating the edge of an image of a high contrast and a high chroma and so causing an atmosphere which felt as if a miniature model or toy is being viewed to be created on a screen. For example, the diorama is implemented by a combination of hue/chroma processing, contrast processing, peripheral gradation processing, synthesis processing, and the like. Of these, in the peripheral gradation processing, low pass filter processing is performed while changing a low pass filter coefficient according to the position of an image such that a fading degree increases as the distance from the center of an image increases, that is, it is closer to a peripheral part. Further, the peripheral gradation processing may be performed such that the top and bottom of an image or the left and right of an image is gradated.

The toy photo is processing of causing brightness to decrease (darken) as the distance from the center of an image increases and giving an effect of being sucked into unusual space when looking through a hole. For example, the toy photo is implemented by a combination of image processing such as shading processing of multiplying a brightness signal by a coefficient whose value decreases as it is closer to a peripheral part in addition to low pass filter processing, white balance processing, contrast processing, and hue/chroma processing (for example, see Japanese Laid-open Patent Publication No. 2010-074244 for the details of the toy photo and the shading).

The rough monochrome is processing of adding a high contrast and granular noise of a film and rendering a dynamic or rough monochrome image. For example, the rough monochrome is implemented by a combination of edge enhancement processing, level correction optimization processing, noise pattern overlap processing, synthesis processing, contrast processing, and the like (for example, see Japanese Laid-open Patent Publication No. 2010-062836 for the details of the rough monochrome). The noise pattern overlap processing (noise addition processing) is processing of adding a previously generated noise pattern image to an original image. For example, a random number may be generated and used to generate the noise pattern image.

Further, besides the artistic effect processing, the artistic effect image processing unit 162 can perform, for example, cross filter processing of drawing a cross pattern on a high-brightness part of an image or white edge processing of causing an effect of gradually taking on a white tint as it is closer from the center of an image to the edge thereof.

The moving image special effect image processing unit 163 performs image processing of adding a special effect to an image during moving image recording. Examples of a moving image special effect executable by the moving image special effect image processing unit 163 includes a multiecho, a one-shot echo, a transit, and a fluctuation. The moving image special effects will be described below.

Figure 4:
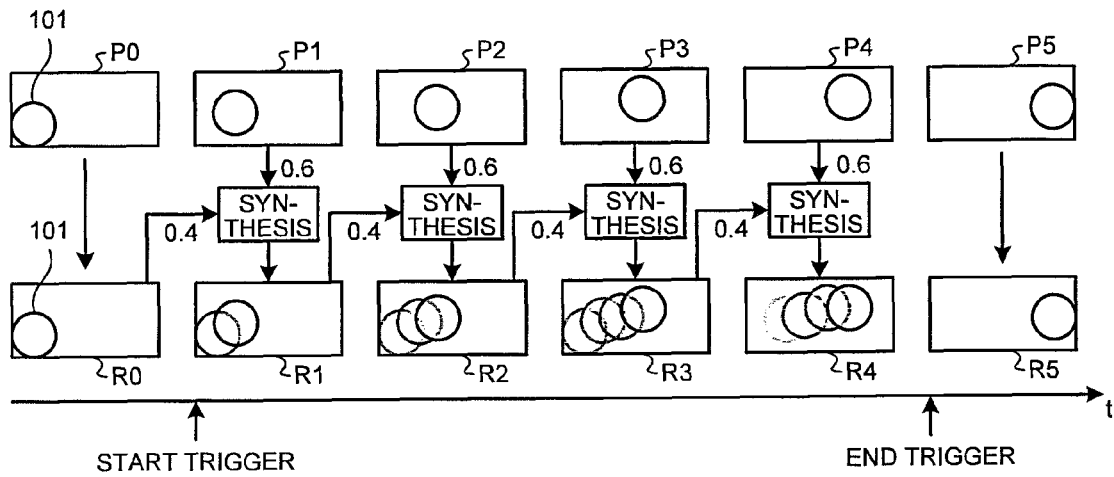
FIG. 4 is a diagram for describing an outline of a multi-echo.

FIG. 4 is a diagram for describing an outline of a multiecho. The multiecho refers to an effect of leaving an afterimage on an image by repeatedly synthesizing an immediately previous recording image with a currently captured image during a predetermined time period. Specifically, an effect by which the trajectory along which a ball 101 moves is displayed as an afterimage is given as illustrated in FIG. 4.

Here, in a state in which the multiecho remains set as the moving image special effect, when a start trigger is received, the moving image special effect image processing unit 163 performs processing (multiecho processing) of synthesizing an image generated directly after that with an image of an immediately previous frame at a predetermined ratio.

In the example illustrated in FIG. 4, the moving image special effect image processing unit 163 generates a multiecho image R1 by synthesizing a captured image P1 captured directly after the start trigger is input with a recording image R0 corresponding to a captured image P0 of an immediately previous frame. At the time of this synthesis, in each pixel, a signal of the captured image P1 is multiplied by a coefficient 0.6, and a signal of the recording image R0 is multiplied by a coefficient 0.4.

Next, the moving image special effect image processing unit 163 generates a multiecho image R2 by synthesizing the synthesized image R1 with a captured image P2 of a next frame. Here, in order to generate the multiecho image R2, in each pixel, a signal of the captured image P2 is multiplied by a coefficient 0.6, a signal of the synthesized image R1 is multiplied by a coefficient 0.4.

The moving image special effect image processing unit 163 repeatedly performs the above-described synthesis processing until an end trigger is input and thus sequentially generates multiecho images. Here, when the end trigger is input, a recording image R5 corresponding to a captured image P5 is recorded in the recording medium 23.

Figure 5:
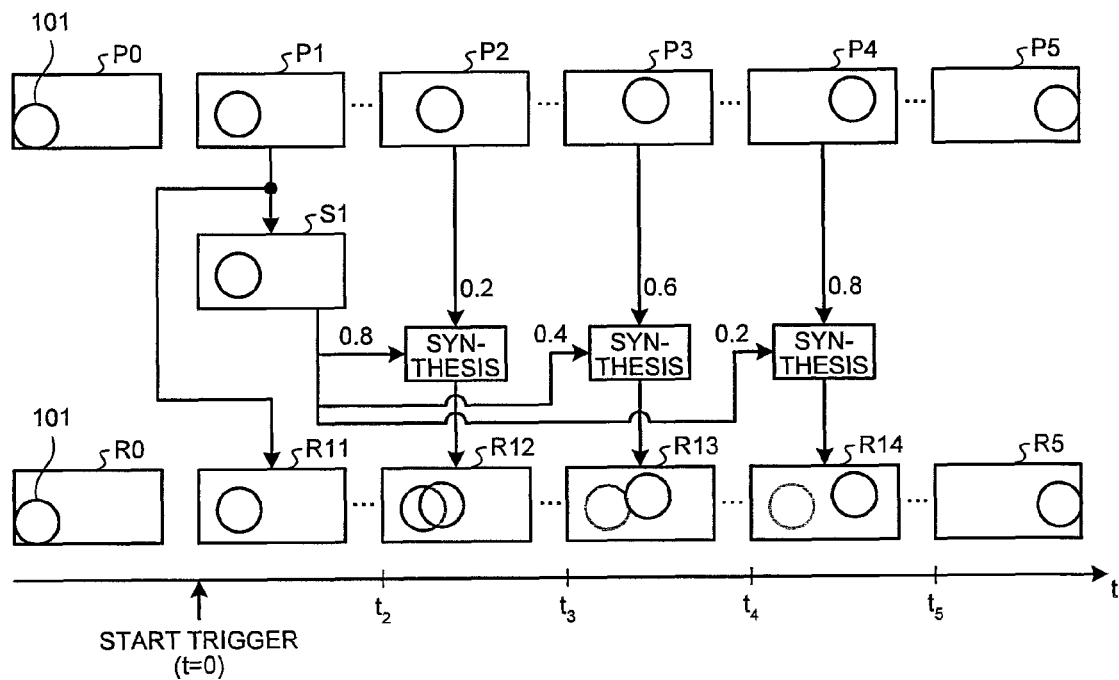
FIG. 5 is a diagram for describing an outline of a one-shot echo.

FIG. 5 is a diagram for describing an outline of a one-shot echo. The one-shot echo refers to an effect by which an image (a momentary image) of a certain frame steadily disappears while becoming thinner. Specifically, an effect by which the ball 101 captured at a certain time remains on a captured image as an afterimage for a while as illustrated in FIG. 5 is given.

Here, in a state in which the one-shot echo remains set as the moving image special effect, when the start trigger is received, the moving image special effect image processing unit 163 performs processing (one-shot echo processing) of storing image data, which has been captured directly after that and recorded, in the SDRAM 25 and then synthesizing the image data with image data captured after that such that a weight steadily decreases over time.

In the example illustrated in FIG. 5, a captured image P1 captured directly after the start trigger is input is stored in the SDRAM 25 (hereinafter, referred to as an "SDRAM image S1"). The moving image special effect image processing unit 163 synthesizes the SDRAM image S1 stored in the SDRAM 25 with a most recently captured image at a predetermined ratio.

In the example illustrated in FIG. 5, a one-shot echo image R11 corresponding to the captured image P1 is displayed directly after the start trigger is input.

Thereafter, when a time t is $t_2$, the moving image special effect image processing unit 163 generates a one-shot echo image R12 by synthesizing the SDRAM image S1 with a captured image P2. At the time of this synthesis, in each pixel, a signal of the SDRAM image S1 is multiplied by a coefficient a (=0.8), and a signal of the captured image P2 is multiplied by a coefficient 1−a (=0.2).

Thereafter, when the time t is $t_3$, the moving image special effect image processing unit 163 generates a one-shot echo image R13 synthesized such that the coefficient a by which a signal of the SDRAM image S1 is multiplied is set to 0.4, and the coefficient 1−a by which a signal of a captured image P3 is multiplied is set to 0.6.

Thereafter, when the time t is $t_4$, the moving image special effect image processing unit 163 generates a one-shot echo image R14 synthesized such that the coefficient a by which a signal of the SDRAM image S1 is multiplied is set to 0.2 and the coefficient 1−a by which a signal of a captured image P4 is multiplied is set to 0.8.

Thereafter, when the time t is $t_5$, the coefficient a becomes zero (0), a captured image P5 is used as a recording image R5.

Figure 6:
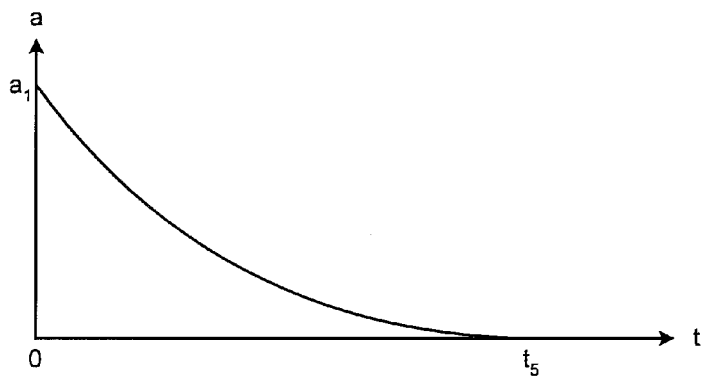
FIG. 6 is a diagram illustrating a temporal change in a synthesis ratio of an SDRAM image to be synthesized with a most recently captured image.

FIG. 6 is a diagram illustrating a temporal change in a synthesis ratio of an SDRAM image to be synthesized with a most recently captured image. In FIG. 6, a horizontal axis t represents a time elapsed from a point in time (t=0) at which the start trigger is input, and a vertical axis a represents a coefficient by which each pixel signal of the SDRAM image S1 is multiplied. As illustrated in FIG. 6, the coefficient a becomes $a_1$ when the time t is zero (0), decreases smoothly over time, and then becomes zero (0) at a point in time at which a predetermined time $t_5$ elapses after the start trigger is input. In other words, the ratio at which the SDRAM image S1 occupies in the synthesized image is set to steadily decrease over time. Thus, an image appearing as if the SDRAM image S1 steadily disappears over time can be generated.

The curved line illustrated in FIG. 6 is merely an example, and as far as a curved line smoothly changes such that the coefficient a decreases over time and becomes zero (0) at a predetermined time, any curved line may be applied. For example, a curved line including a time period for which the coefficient a has a predetermined value may be applied.

Further, the coefficient a may be decided according to the number of frames after the start trigger is input. In this case, it is preferable that a value of the coefficient a steadily decrease in units of frames, and then the coefficient become zero (0) at a predetermined number of frames (for example, 120 frames).

Figure 7:
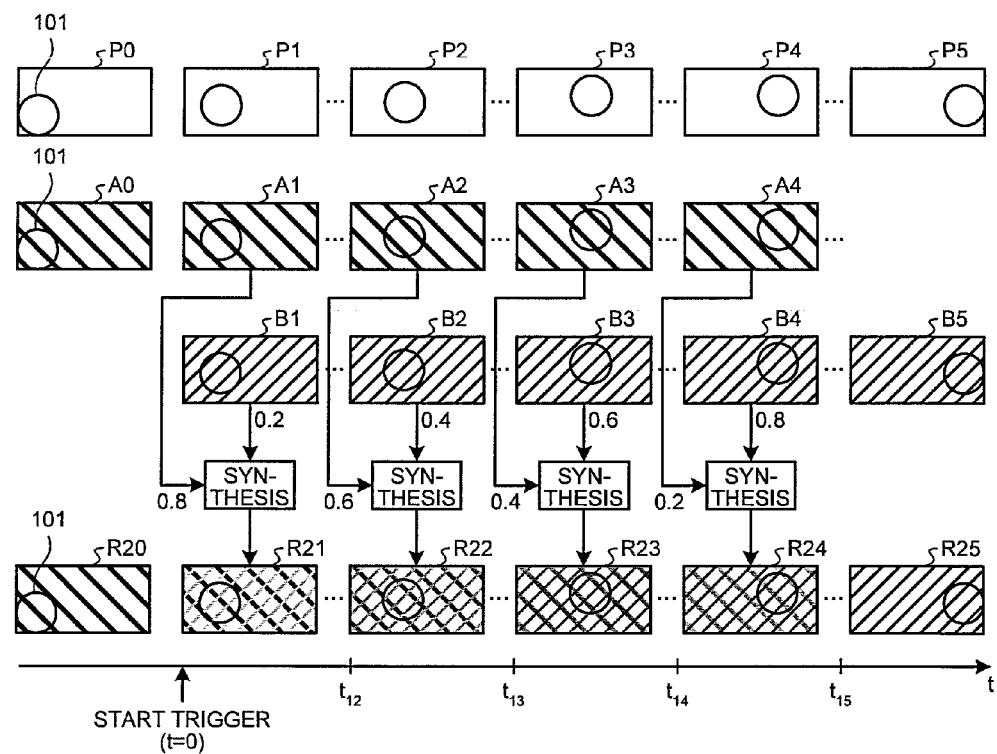
FIG. 7 is a diagram for describing an outline of a transit.

FIG. 7 is a diagram for describing an outline of a transit. The transit refers to an effect by which an artistic effect to be applied to one image changes to another artistic effect while steadily changing a ratio thereof. FIG. 7 schematically illustrates the transit that changes from an artistic effect A to an artistic effect B. In FIG. 7, directly before a start trigger for the transit is input, an artistic effect image A0 in which the artistic effect A is applied to a captured image P0 is generated. A time taken from a switching start of an artistic effect by the transit to a switching end may be arbitrarily set.

In the example illustrated in FIG. 7, the artistic effect A is assumed to be set before the start trigger is input. In other words, it is assumed that directly before the start trigger is input, the artistic effect image processing unit 162 has generated an artistic effect image R20 in which the artistic effect A is applied to the captured image P0.

Then, when the start trigger is input, the moving image special effect image processing unit 163 generates a transit image R21 such that an image in which an artistic effect image A1 obtained by applying the artistic effect A to a captured image P1 is multiplied by a coefficient b (=$b_0$) of 0.8 is synthesized with an image in which an the artistic effect image B1 obtained by applying the artistic effect B to the captured image P1 is multiplied by a coefficient 1−b (=1−$b_0$) of 0.2.

Thereafter, when the time t is $t_{12}$, the moving image special effect image processing unit 163 generates a transit image R22 synthesized such that the coefficient b by which a signal of an artistic effect image A2 obtained by applying the artistic effect A to a captured image P2 is multiplied is set to 0.6, and the coefficient 1−b by which a signal of an artistic effect image B2 obtained by applying the artistic effect B to the captured image P2 is multiplied is set to 0.4.

Thereafter, when the time t is $t_{13}$, the moving image special effect image processing unit 163 generates a transit image R23 synthesized such that the coefficient b by which a signal of an artistic effect image A3 obtained by applying the artistic effect A to a captured image P3 is multiplied is set to 0.4, and the coefficient 1−b by which a signal of an artistic effect image B3 obtained by applying the artistic effect B to the capture image P3 is multiplied is set to 0.6.

Thereafter, when the time t is $t_{14}$, the moving image special effect image processing unit 163 generates a transit image R24 synthesized such that the coefficient b by which a signal of an artistic effect image A4 obtained by applying the artistic effect A to a captured image P4 is multiplied is set to 0.2, and the coefficient 1−b by which a signal of an artistic effect image B4 obtained by applying the artistic effect B to the captured image P4 is multiplied is set to 0.8.

Thereafter, when the time t is $t_{15}$, the moving image special effect image processing unit 163 generates a transit image R25 in which the artistic effect B is applied to the captured image P5 (b=0).

Figure 8:
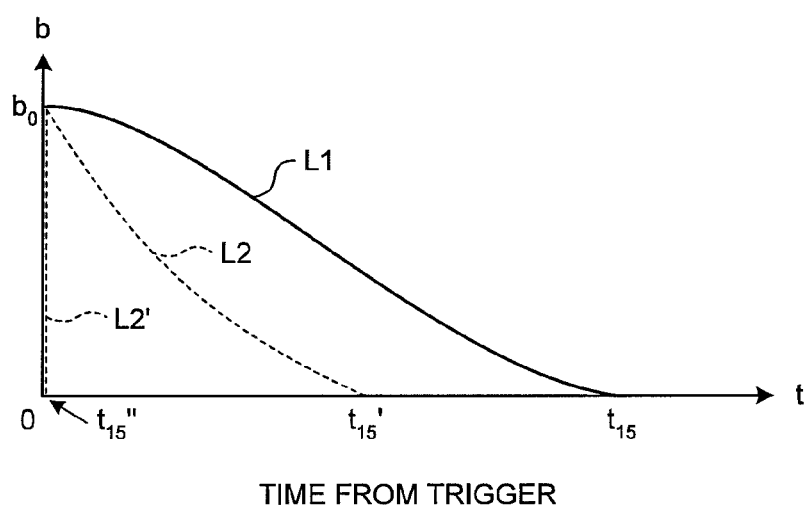
FIG. 8 is a diagram illustrating a temporal change in a coefficient of an artistic effect applied before a start trigger is input in transit processing.

FIG. 8 is a diagram illustrating a temporal change in the synthesis ratio (coefficient) b of the artistic effect applied before the start trigger is input in the transit processing. In FIG. 8, a curved line L1 represents a temporal change in the coefficient b during moving image recording. In the curved line L1, the coefficient b is $b_0$ when the time t is zero (0), smoothly decreases over time, and then becomes zero (0) at a time in point when a predetermined time $t_{15}$ elapses after the start trigger is input.

Meanwhile, a curved line L2 illustrated in FIG. 8 represents a temporal change in the coefficient b when a moving image is not recorded. In the curved line L2, the coefficient b is $b_0$ when the time t is zero (0) and then steadily decreases over time, but the curved line L2 is larger in the ratio of phenomenon than the curved line L1. Thus, a time $t_{15}'$ taken until the coefficient b becomes zero (0) is smaller than the time $t_{15}$ ($t_{15}' < t_{15}$).

Further, the curved line L2' illustrated in FIG. 8 represents another temporal change in the coefficient b when a moving image is not recorded. In the curved line L2', a time $t_{15}''$ taken until the coefficient b becomes zero (0) is a value slightly larger than zero (0). In other words, in the case of the curved line L2', the coefficient b becomes zero (0) directly after the start trigger is input.

As described above, according to the first embodiment, a time required for transit processing during moving image recording is different from that during moving image non-recording. Thus, the user can quickly check a transit effect during moving image recording. On the other hand, during moving image non-recording, it is possible to view a situation an artistic effect by the transit changes.

The curved lines L1 and L2 illustrated in FIG. 8 are examples, and as far as a curved line smoothly changes such that the coefficient b decreases over time and becomes zero (0) at a predetermined time, any curved line may be applied. For example, a curved line including a time period for which the coefficient b has a predetermined value may be applied.

Further, the coefficient b may be decided according to the number of frames after the start trigger is input. In this case, it is preferable that a value of the coefficient b smoothly decrease in units of frames, and the coefficient become zero (0) at a predetermined number of frames (for example, 120 frames).

Figure 9:
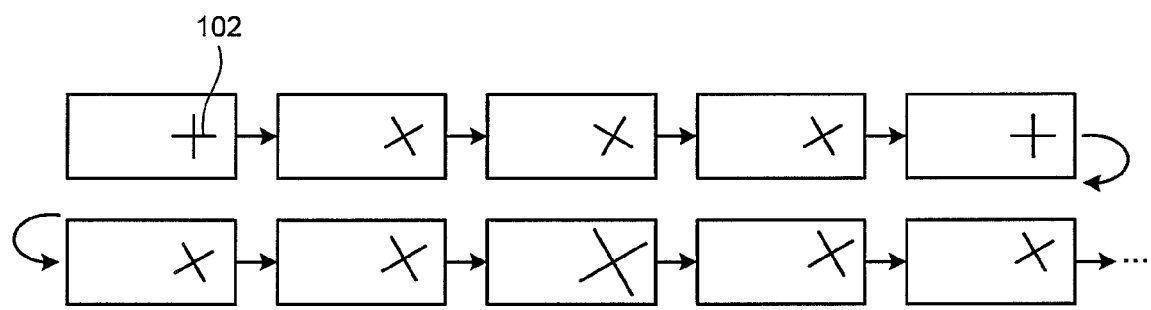
FIG. 9 is a diagram illustrating an outline of a fluctuation.

FIG. 9 is a diagram illustrating an outline of a fluctuation. The fluctuation refers to an effect obtained by randomly changing an application degree of an artistic effect to be applied to each frame of a moving image over time. FIG. 9 illustrates an example in which an artistic effect is a cross filter. In this case, the moving image special effect image processing unit 163 applies a fluctuation by randomly rotating a cross 102 over time, and randomly changing the size of the cross 102 over time.

Continuously, the configuration of the imaging device 1 will be described.

The AE processing unit 17 acquires image data recorded the SDRAM 25 through the bus 28, and sets the exposure condition used when capturing a still image or a moving image based on the acquired image data. Specifically, the AE processing unit 17 performs automatic exposure of the imaging device 1 by calculating brightness based on image data and then deciding a setting value of an aperture value (F value), a shutter speed, and the like based on the calculated brightness.

The AF processing unit 18 acquires image data recorded in the SDRAM 25 through the bus 28, and performs an automatic focal adjustment of the imaging device 1 based on the acquired image data. For example, the AF processing unit 18 performs an automatic focal adjustment of the imaging device 1 such that focus evaluation of the imaging device 1 is decided by extracting a signal of a high frequency component from image data and performing an AF (Auto Focus) calculation process on the signal of the high frequency component.

The image compressing/decompressing unit 19 acquires image data recorded in the SDRAM 25 through the bus 28, compresses the acquired image according to a predetermined format, and then outputs the compressed image data to the SDRAM 25. Here, the JPEG (Joint Photographic Experts Group) format, the Motion JPEG format, the MP4 (H.264), or the like may be used as the predetermined format. Further, the image compressing/decompressing unit 19 acquires image data (compressed image data) recorded in the recording medium 23 through the bus 28 and the memory I/F 24, decompresses the acquired image data, and then outputs the decompressed image data to the SDRAM 25. Instead of the recording medium 23, a storage unit may be disposed in the imaging device 1.

The input unit 20 includes a setting signal input unit 201 that receives an input of various kinds of setting signals including a still image capturing condition setting signal used to set a capturing condition on still image capturing and moving image capturing, a moving image capturing signal input unit 202 that receives an input of a moving image capturing start signal instructing at least moving image capturing to start, and a moving image special effect start signal input unit 203 that receives an input of a moving image special effect start signal instructing a moving image special effect to start.

The input unit 20 is implemented using a user interface for an operation signal input disposed on the surface of the main body unit 2. Next, a configuration of the user interface serving as a part of the input unit 20 will be described.

As the user interface for the operation signal input, the imaging device 1 includes a power button 41 to switch a power state of the imaging device 1 to an on state or an off state, a release button 42 to receive an input of a still image release signal used to give a still image capturing instruction, a mode dial 43 to change various kinds of shooting modes set to the imaging device 1, an operation button 44 to change various kinds of settings of the imaging device 1, a menu button 45 to cause various kinds of settings of the imaging device 1 to be displayed on the display unit 21, a playback button 46 to cause an image corresponding to image data recorded in the recording medium 23 to be displayed on the display unit 21, a moving image button 47 to receive an input of a moving image release signal giving a moving image capturing instruction, a function key 48 to set various kinds of functions of the imaging device 1, an erase button 49 to erase data, and a touch panel 50 disposed to be superimposed on a display screen of the display unit 21 and used to receive an input signal corresponding to a contact position from the outside.

The release button 42 moves forward or backward by external pressure. Here, when the release button 42 is pressed halfway, a first release signal instructing a shooting preparation operation is input. On the other hand, when the release button 42 is fully pressed, a second release signal instructing still image capturing is input.

The operation button 44 includes a cross key 441 forming a cross shape in top, bottom, left, and right directions to perform a selection setting input in a menu screen or the like, and a decision button 442 to decide selection by the cross key 441. The cross key 441 includes an up-arrow key 443, a down-arrow key 444, a left-arrow key 445, and a right-arrow key 446.

In the user interface described above, the buttons other than the moving image button 47 configure a part of the setting signal input unit 201. The moving image button 47 configures a part of the moving image capturing signal input unit 202.

Further, the function key 48 has a function of the moving image special effect start signal input unit 203.

FIG. 10 is a diagram illustrating an example of assigning an operation to each arrow of the cross key 441 when it is not in the process of moving image recording (during moving image non-recording) and when it is in the process of moving image recording (during moving image recording). Here, when it is not in the process of moving image recording, an exposure correction operation is assigned to the up-arrow key 443. A continuous shooting/single shooting operation is assigned to the down-arrow key 444. An AF target operation is assigned to the left-arrow key 445. A flash setting operation is assigned to the right-arrow key 446.

Next, an example when it is in the process of moving image recording will be described. In this case, a one-shot echo start operation is assigned to the up-arrow key 443. A transit start operation is assigned to the down-arrow key 444. The left-arrow key 445 functions as a toggle key to alternately assign a multiecho start operation and a multiecho end operation. A fluctuation start operation is assigned to the right-arrow key 446. Further, when a setting is made such that the end of the fluctuation can be arbitrarily selected, it is desirable to cause the right-arrow key 446 to function as a toggle key to alternately operate a start operation and an end operation of the fluctuation.

An assignment of an input button at the time of moving image recording is not limited to the example illustrated in FIG. 10.

The display unit 21 is configured using a liquid crystal display panel, an organic EL (Electro Luminescence) display panel, or the like. The display driving unit 22 acquires image data stored in the SDRAM 25 or image data stored in the recording medium 23 through the bus 28, and causes an image corresponding to the acquired image data to be displayed on the display unit 21. Here, examples of a display of an image include a rec-view display in which an image data directly after shooting is displayed only for a predetermined time (for example, three seconds), a playback display in which image data stored in the recording medium 23 is played back, and a live-view display in which live-view images corresponding to image data continuously generated by the imaging element 12 are sequentially displayed in time series. Further, the display unit 21 appropriately displays operation information and shooting-related information of the imaging device 1.

The recording medium 23 is configured using, for example, a memory card mounted from the outside of the imaging device 1. The recording medium 23 is removably mounted to the imaging device 1 through the memory I/F 24. Image data processed by the image processing unit 16 or the image compressing/decompressing unit 19 is written in the recording medium 23 through a reading/writing device (not illustrated) corresponding to a kind thereof, or image data recorded in the recording medium 23 is read through the reading/writing device. In addition, the recording medium 23 may output imaging program and various kinds of information to the flash memory 26 through the memory I/F 24 and the bus 28 under control of the control unit 29.

The SDRAM 25 is configured using a volatile memory. The SDRAM 25 has a function as a primary storage unit that temporarily stores image data input from the A/D converting unit 15 through the bus 28, processed image data input from the image processing unit 16, and information which is being processed by the imaging device 1. For example, the SDRAM 25 temporarily stores image data sequentially output in units of frames from the imaging element 12 through the signal processing unit 14, the A/D converting unit 15, and the bus 28.

The flash memory 26 is configured using non-volatile memory. The flash memory 26 includes a program recording unit 261, a special effect processing information recording unit 262, and an image processing information recording unit 263. The program recording unit 261 records various kinds of programs for operating the imaging device 1, an imaging program, various kinds of data used during execution of a program, various kinds of parameters necessary for an image processing operation by the image processing unit 16, and the like. The special effect processing information recording unit 262 records image processing combination information in each artistic effect processing performed by the artistic effect image processing unit 162. The image processing information recording unit 263 records image processing information in which a processing time is associated with image processing executable by the image processing unit 16. In addition, the flash memory 26 records a manufacturing number specifying the imaging device 1 and the like.

The main body communication unit 27 is a communication interface for performing communication with the lens unit 3 mounted to the main body unit 2. The main body communication unit 27 also includes an electrical contact point with the lens unit 3.

The bus 28 is configured using, for example, a transmission path connecting the respective components of the imaging device 1. The bus 28 transfers various kinds of data internally generated in the imaging device 1 to the respective components of the imaging device 1.

The control unit 29 is configured using a CPU (Central Processing Unit) or the like. The control unit 29 includes an image processing control unit 291 and a display control unit 292.

The image processing control unit 291 sets content of image processing to be executed by the image processing unit 16 in response to an instruction signal from the input unit 20, which is input through the bus 28, and causes any one of the basic image processing unit 161, the artistic effect image processing unit 162, and the moving image special effect image processing unit 163 to execute image processing according to the set content.

The display control unit 292 controls a display form of the display unit 21. Specifically, the display control unit 292 drives the display driving unit 22, and causes an image corresponding to various kinds of image data processed by the image processing unit 16 to be displayed on the display unit 21.

The control unit 29 controls an operation of the imaging device 1 in general by transmitting a control signal or various kinds of data to the respective components configuring the imaging device 1 in response to an instruction signal transmitted from the input unit 20 through the bus 28.

Here, when the second release signal is input through the release button 42, the control unit 29 performs control such that the imaging device 1 starts a still image capturing operation. Further, when the moving image capturing start signal is input through the moving image button 47, the control unit 29 performs control such that the imaging device 1 starts a moving image capturing operation. Here, the image capturing operation in the imaging device 1 refers to an operation in which the signal processing unit 14, the A/D converting unit 15, and the image processing unit 16 execute predetermined processing on image data which the imaging element 12 has output according to driving of the shutter driving unit 11 and the imaging element driving unit 13. The image data processed in the above-described way is compressed according to a predetermined format through the image compressing/decompressing unit 19, and then recorded in the recording medium 23 through the bus 28 and the memory I/F 24 under control of the image processing control unit 291. In the first embodiment, the recording medium 23 serves a part of the storage unit. However, separately from the recording medium 23, a storage area having a function of a storage unit is secured inside the imaging device 1, and compressed image data may be stored in the storage area.

The main body unit 2 having the above-described configuration may further include an audio input/output unit, a fill light emitting unit that emits a fill light (flash) to a subject, a communication unit having a function of performing two-way communication with an external device through the Internet, and the like.

Next, a configuration of the lens unit 3 will be described. The lens unit 3 includes an optical system 31, a lens driving unit 32, a diaphragm 33, a diaphragm driving unit 34, a lens operating unit 35, a lens flash memory 36, a lens communication unit 37, and a lens control unit 38.

The optical system 31 is configured using one or more lenses. The optical system 31 condenses light from a predetermined field region. The optical system 31 has an optical zoom function of changing an angle of view and a focus function of changing a focus.

The lens driving unit 32 is configured using a direct current (DC) motor, a stepping motor, or the like, and changes, for example, a focus position or an angle of view of the optical system 31 by moving a lens of the optical system 31 on an optical axis L.

The diaphragm 33 adjusts exposure by limiting an amount of incident light condensed by the optical system 31.

The diaphragm driving unit 34 is configured using a stepping motor or the like, and drives the diaphragm 33.

The lens operating unit 35 is a ring disposed around a lens barrel of the lens unit 3 as illustrated in FIG. 2, and receives an input of an operation signal to start an optical zoom operation in the lens unit 3 or an input of an instruction signal instructing a focus position adjustment in the lens unit 3. The lens operating unit 35 may be a push-type switch or the like.

The lens flash memory 36 records a control program that decides the position and movement of the optical system 31, lens characteristics of the optical system 31, and various kinds of parameters.

The lens communication unit 37 is a communication interface that performs communication with the main body communication unit 27 of the main body unit 2 when the lens unit 3 is mounted to the main body unit 2. The lens communication unit 37 also includes an electrical contact point with the main body unit 2.

The lens control unit 38 is configured using a CPU (Central Processing Unit) or the like. The lens control unit 38 controls an operation of the lens unit 3 in response to an operation signal of the lens operating unit 35 or an instruction signal from the main body unit 2. Specifically, in response to the operation signal of the lens operating unit 35, the lens control unit 38 drives the lens driving unit 32 to perform a focusing operation or a zoom change operation of the lens unit 3, and drives the diaphragm driving unit 34 to change an aperture value. Further, the lens control unit 38 may be configured to transmit focus position information of the lens unit 3, a focus distance, specific information identifying the lens unit 3, and the like to the main body unit 2 when the lens unit 3 is mounted to the main body unit 2.

Figure 11:
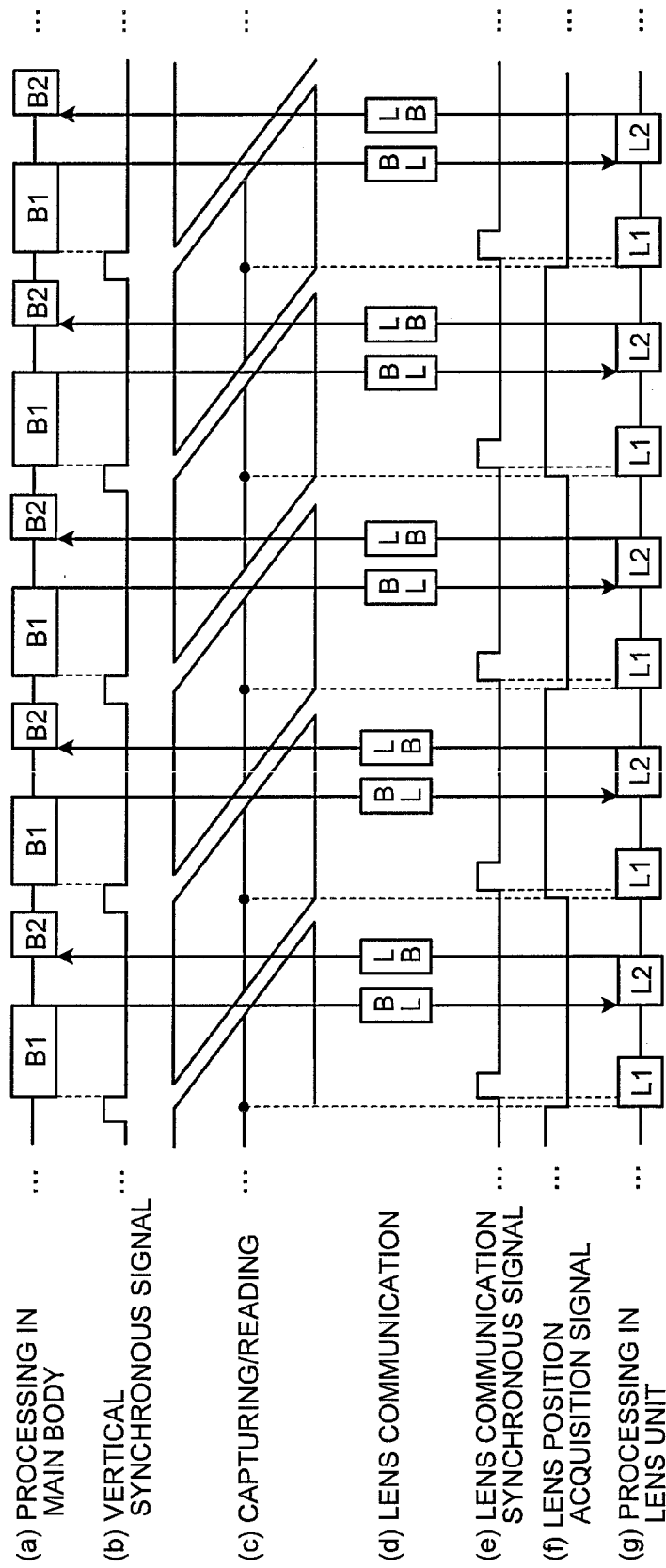
FIG. 11 is a timing chart illustrating an example of synchronous communication between a lens control unit and a control unit of the imaging device according to the first embodiment of the present invention.

The lens control unit 38 promotes operation cooperation with the main body unit 2 by exchanging a lens communication signal with the control unit 29 of the main body unit 2 at a predetermined period. FIG. 11 is a timing chart illustrating an example of synchronous communication between the lens control unit 38 and the control unit 29. FIG. 11(a) illustrates processing performed inside the main body unit 2. FIG. 11(b) illustrates a vertical synchronous signal. FIG. 11(c) illustrates an imaging timing and a reading timing. FIG. 11(d) illustrates lens communication. FIG. 11(e) illustrates a lens communication synchronous signal. FIG. 11(f) illustrates a lens position acquisition signal. FIG. 11(g) illustrates processing performed inside the lens unit 3.

First, the control unit 29 causes the image processing unit 16 to execute image processing and a calculation of an AF evaluation value of live-view image based on image data acquired in a previous frame, and transmits a lens state data request command used to acquire lens state data to the lens control unit 38 (B1 and BL). At this time, the control unit 29 transmits a synchronous signal for lens communication and a lens position acquisition signal instructing a timing to acquire position information of the optical system 31 at the same period as the vertical synchronous signal in a synchronous communication mode. The lens position acquisition signal is a signal whose state changes at a point in time at which half an accumulation time of a central portion of the imaging element 12 elapses as illustrated in FIG. 11(c).

The lens control unit 38 acquires position information of the optical system 31 at a timing at which the state of the lens position acquisition signal changes, and detects an operation state of the lens operating unit 35 at a reception timing of the lens communication synchronous signal (L1).

Next, the lens control unit 38 transmits lens state data including the position information of the optical system 31 and the detection state of the lens operating unit 35 which are acquired in the process L1 to the control unit 29 in response to the lens state data request command received from the control unit 29 (L2).

Thereafter, the control unit 29 performs a calculation of the AF evaluation value and various kinds of setting changes such as an exposure value change based on the lens state data transmitted from the lens control unit 38 (B2).

The control unit 29 and the lens control unit 38 repeatedly perform the above-described processing at regular intervals.

The imaging device 1 having the above-described configuration has a picture mode and a picture bracket mode. Here, the picture mode refers to a mode in which one processing is selected from among the finish effect processing and special effect processing, the image processing unit 16 is caused to execute processing corresponding to the selected processing item, and thus a live-view image or a still image is generated. The picture bracket mode refers to a mode in which a desired combination is selected from among the finish effect processing and the special effect processing, a plurality of images that differ in processing are generated by a single shooting operation by executing processing of the desired combination through the image processing unit 16, and the generated images are recorded in the recording medium 23. Next, a method of setting each of the picture mode and the picture bracket mode executed by the imaging device 1 will be described.

First, the user operates the power button 41, and thus the imaging device 1 is activated. Here, when the display unit 21 is displaying live-view image, the display control unit 292 causes a menu operation screen to be displayed on the display unit 21 in response to the user's operation on the menu button 45.

Figure 12:
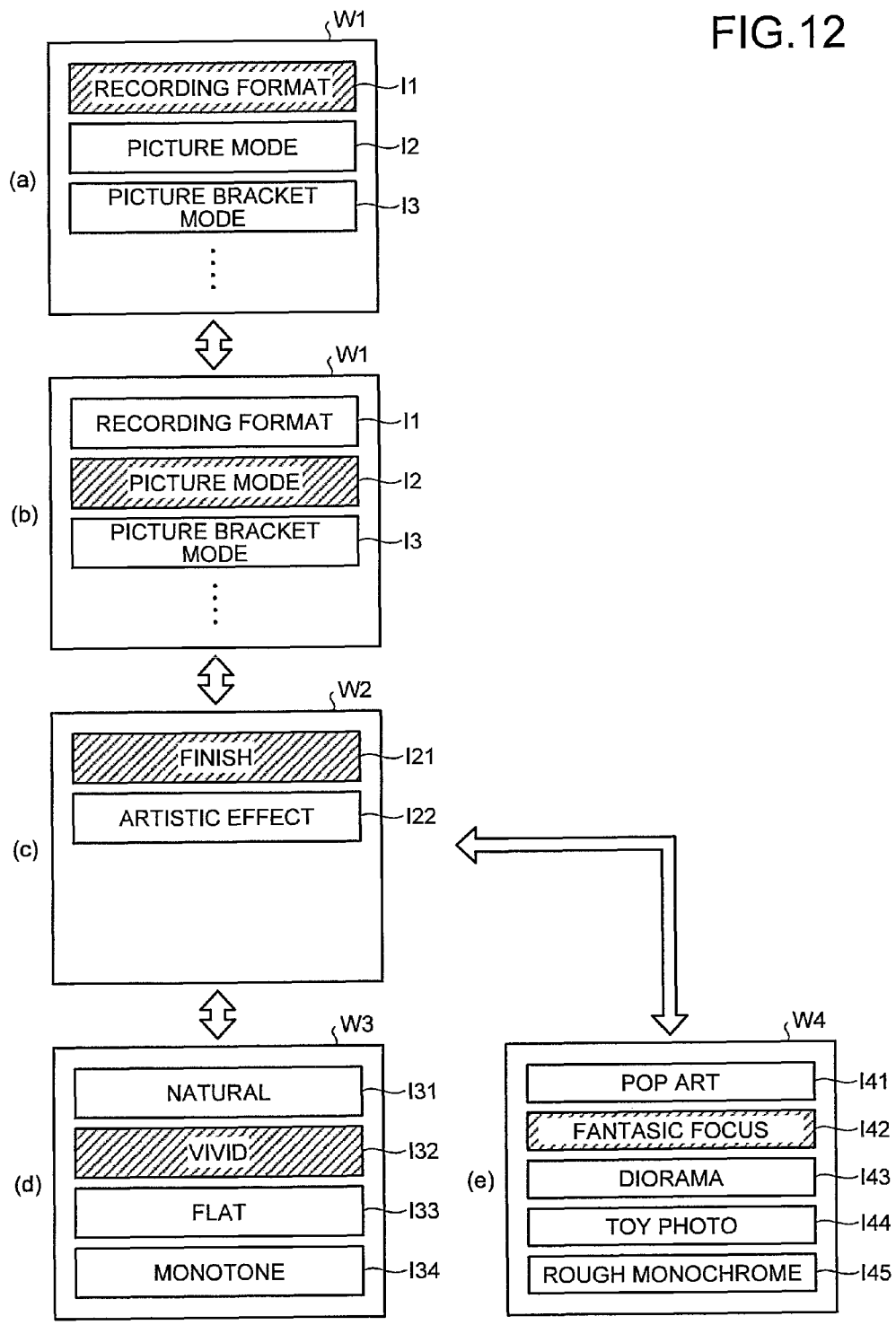
FIG. 12 is a diagram illustrating an example of screen transition in a menu screen displayed by a display unit of the imaging device according to the first embodiment of the present invention.

FIG. 12 is a diagram illustrating an example of screen transition in the menu screen displayed by the display unit 21 when the menu button 45 is operated, and is a diagram illustrating screen transition when the picture mode is set.

As illustrated in FIG. 12, when the menu button 45 is operated, the display control unit 292 causes a menu screen W1 (FIG. 12(a)) showing setting content of the imaging device 1 to be displayed on the display unit 21. A recording format icon I1, a picture mode icon I2, a picture bracket mode icon I3, and the like are displayed on the menu screen W1. Further, when the menu screen W1 remains displayed, the recording format icon I1 is selected by default and highlight-displayed (FIG. 12(a)). In FIG. 12, the highlight display is expressed by hatching for the sake of convenience.

Here, when the user touches a region corresponding to each icon, a signal is input through the touch panel 50. The image processing control unit 291 recognizes the signal input from the touch panel 50 as a selection signal of an icon which the display unit 21 displays corresponding to the touched region, and then performs corresponding processing. In the following description, a selection instruction signal is assumed to be input through the touch panel 50 when an icon is selected. For this reason, in the following description, when a portion of the touch panel 50 corresponding to an icon display region is touched, an expression "icon is selected" may be used. Further, an icon selection input may be made using a button of the input unit 20 rather than the touch panel 50.

The recording format icon I1 is an icon used to receive an input of an instruction signal causing a recording format menu screen used to set a recording format of each of a still image and a moving image to be displayed on the display unit 21. The picture mode icon I2 is an icon used to receive an input of an instruction signal causing a picture mode selection screen to be displayed on the display unit 21. The picture bracket mode icon I3 is an icon used to receive an input of an instruction signal causing a picture bracket mode setting screen to be displayed on the display unit 21.

Here, when the user operates, for example, the up-arrow key 443 or the down-arrow key 444 of the cross key 441 and selects the picture mode icon I2 in a state in which the menu screen W1 is displayed on the display unit 21, the display control unit 292 causes the picture mode icon I2 to be highlight-displayed on the display unit 21 (FIG. 12(b)). Further, the display control unit 292 may change a font or the size of the icons I1 to I3 selected by the user and then causes the icon of the changed font or size to be displayed on the display unit 21.

Further, when the user operates the decision button 442 and selects the icon I2 in a state in which the menu screen W1 is displayed on the display unit 21 (FIG. 12(b)), the display control unit 292 causes a picture mode setting screen W2 to be displayed on the display unit 21 (FIG. 12(c)). A finish icon I21 and an artistic effect icon I22 are displayed on the picture mode setting screen W2. Here, when the user operates the left-arrow key 445 in a state in which the picture mode setting screen W2 is displayed on the display unit 21, the display control unit 292 causes the menu screen W1 (FIG. 12(b)) to be displayed on the display unit 21.

The finish icon I21 is an icon used to receive an input of an instruction signal causing the finish mode selection screen to be displayed on the display unit 21. The artistic effect icon I22 is an icon used to receive an input of an instruction signal causing an artistic effect the shooting mode selection screen to be displayed on the display unit 21.

Here, when the finish icon I21 is decided by the user in a state in which the picture mode setting screen W2 is displayed on the display unit 21, the display control unit 292 causes a finish mode selection screen W3 to be displayed on the display unit 21 (FIG. 12(d)).

A natural icon I31, a vivid icon I32, a flat icon I33, and a monotone icon I34 are displayed on the finish mode selection screen W3 as icons corresponding to selectable processing items of the finish effect processing.

Each of the icons I31 to A34 is an icon used to receive an input of an instruction signal instructing setting of processing corresponding to the finish effect processing performed by the basic image processing unit 161. FIG. 12(d) illustrates a state in which the vivid icon I32 is selected and highlight-displayed.

Here, when the user operates the decision button 442 in a state in which the finish mode selection screen W3 is displayed on the display unit 21, the image processing control unit 291 sets finish effect processing (vivid processing in case of FIG. 12(d)) corresponding to the icon highlight-displayed on the finish mode selection screen W3 through the display unit 21 as processing to be performed in the picture mode.

Further, when the user operates the cross key 441 and selects the artistic effect icon I22 in a state in which the picture mode setting screen W2 is displayed on the display unit 21, the display control unit 292 causes an artistic effect setting screen W4 used to set content of the artistic effect processing performed by the artistic effect image processing unit 162 to be displayed on the display unit 21 (FIG. 12(e)). A pop art icon I41, a fantasic focus icon I42, a diorama icon I43, a toy photo icon I44, and a rough monochrome icon I45 are displayed on the artistic effect setting screen W4 as icons corresponding to selectable processing items of the special effect processing. Each of the icons I41 to A45 is an icon used to receive an input of an instruction signal instructing setting of the artistic effect processing performed by the artistic effect image processing unit 162. FIG. 12(e) illustrates a state in which the fantasic focus icon I42 is selected and highlight-displayed.

Here, when the user operates the decision button 442 in a state in which the artistic effect setting screen W4 is displayed on the display unit 21, the image processing control unit 291 sets artistic effect processing (fantasic focus processing in case of FIG. 12(e)) corresponding to the icon highlight-displayed on the artistic effect setting screen W4 through the display unit 21 as processing to be performed in the picture mode. Information related to the set artistic effect processing is recorded in the SDRAM 25.

Here, when an operation instruction signal causing the screen transition illustrated in FIG. 12 is input through the touch panel 50, the imaging device 1 may decide and execute an operation corresponding to an icon displayed on the display unit 21 when the user touches a region on the touch panel 50 overlapping the icon.

Figure 13:
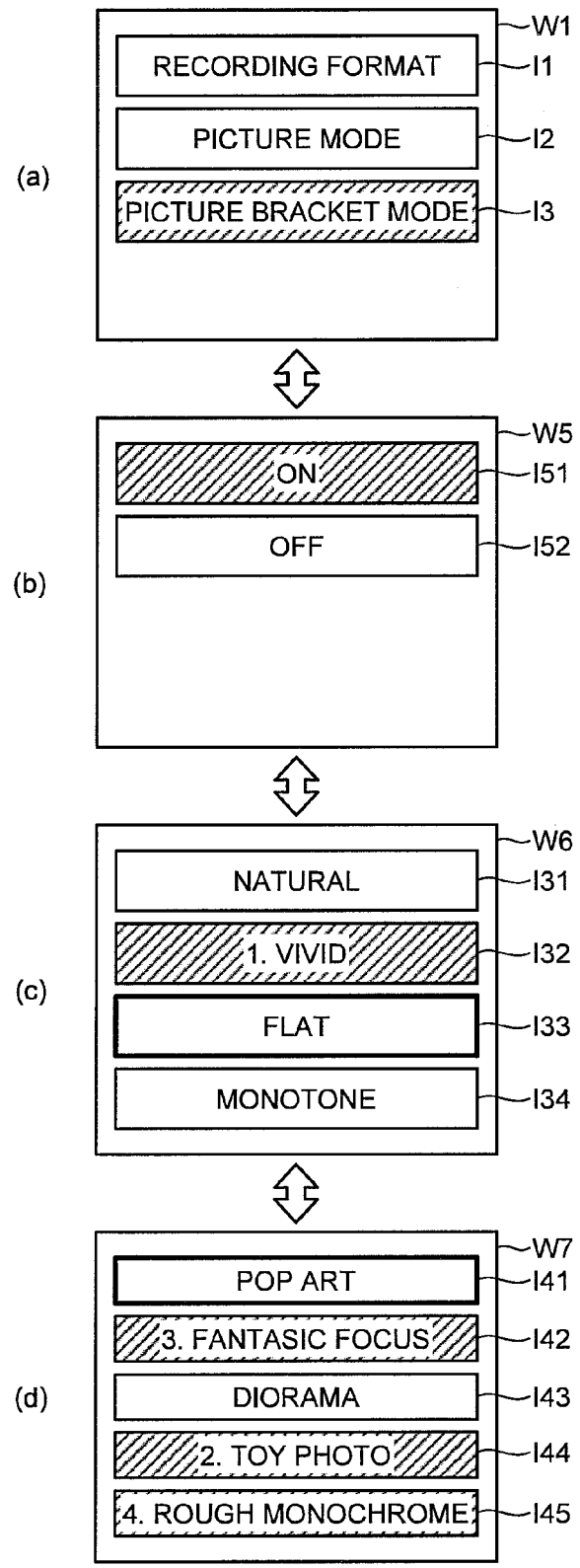
FIG. 13 is a diagram illustrating an example (a second example) of screen transition in a menu screen displayed by a display unit of the imaging device according to the first embodiment of the present invention.

FIG. 13 is a diagram illustrating another example of screen transition in the menu screen displayed the display unit 21 when the menu button 45 is operated, and is a diagram illustrating screen transition when the picture bracket mode is set.

As illustrated in FIG. 13(a), when the user selects the picture bracket mode icon I3 in a state in which the menu screen W1 is displayed on the display unit 21, the picture bracket mode icon I3 is highlight-displayed.

Here, when the user operates the decision button 442 in a state in which the menu screen W1 is displayed on the display unit 21, the display control unit 292 causes a picture bracket mode setting screen W5 to be displayed on the display unit 21 (FIG. 13(b)). An ON icon I51 and an OFF icon I52 are displayed on the picture bracket mode setting screen W5.

The ON icon I51 is an icon used to receive an input of an instruction signal used to set the imaging device 1 to the picture bracket mode and to set a setting flag of the picture bracket mode to an on state. The OFF icon I52 is an icon used to receive an input of an instruction signal used not to set the imaging device 1 to the picture bracket mode and to set the setting flag of the picture bracket mode to an off state. FIG. 13(b) illustrates a state in which the ON icon I51 is selected and highlight-displayed.

Here, when the user operates the operation button 44 and selects and decides the ON icon I51 in a state in which the picture bracket mode setting screen W5 is displayed on the display unit 21, the display control unit 292 causes a picture bracket mode selection screen W6 to be displayed on the display unit 21 (FIG. 13(c)). Icons I31 to I34 corresponding to processing items of processing executable by the image processing unit by a picture bracket are displayed on the picture bracket mode selection screen W6.

In a state in which the picture bracket mode selection screen W6 is displayed on the display unit 21, the user selects a predetermined icon on the picture bracket mode selection screen W6 and sets a process item to be performed in the picture bracket mode by operating the decision button 442 or the down-arrow key 444. At this time, the display control unit 292 causes the icon selected by the user to be active-displayed on the display unit 21 in response to an operation signal input from the operation button 44. FIG. 13(c) illustrates a state in which processing corresponding to the vivid icon I32 is set as processing to be performed in the picture bracket mode, and the flat icon I33 is selected and active-displayed. A number "1" displayed on the vivid icon I32 represents an order selected as a picture bracket. In FIG. 13, the active display is performed such that a frame of an icon is thickly depicted.

Here, when the user operates the down-arrow key 444 in a state in which the active-display icon is the monotone icon I34 in a state in which the picture bracket mode selection screen W6 is displayed on the display unit 21, the display control unit 292 scrolls the picture bracket mode selection screen W6, and causes a picture bracket mode selection screen W7 to be displayed on the display unit 21 (FIG. 13(d)).

At this time, icons I41 to I45 respectively corresponding to processing items of a plurality of artistic effect processing executable by the artistic effect image processing unit 162 in the picture bracket mode are displayed on the picture bracket mode selection screen W7. Specifically, the pop art icon I41, the fantasic focus icon I42, the diorama icon I43, the toy photo icon I44, and the rough monochrome icon I45 are displayed. In the example illustrated in FIG. 13(d), the pop art icon I41 is active-displayed, and the fantasic icon I42, the toy photo icon I44, and the rough monochrome icon I45 are highlight-displayed. A picture bracket selection order is "1. Vivid"→"2. Toy photo"→"3. Fantasic focus"→"4. Rough monochrome."

Next, the user ends setting of the picture bracket mode by operating the left-arrow key 445 or the release button 42.

Figure 14:
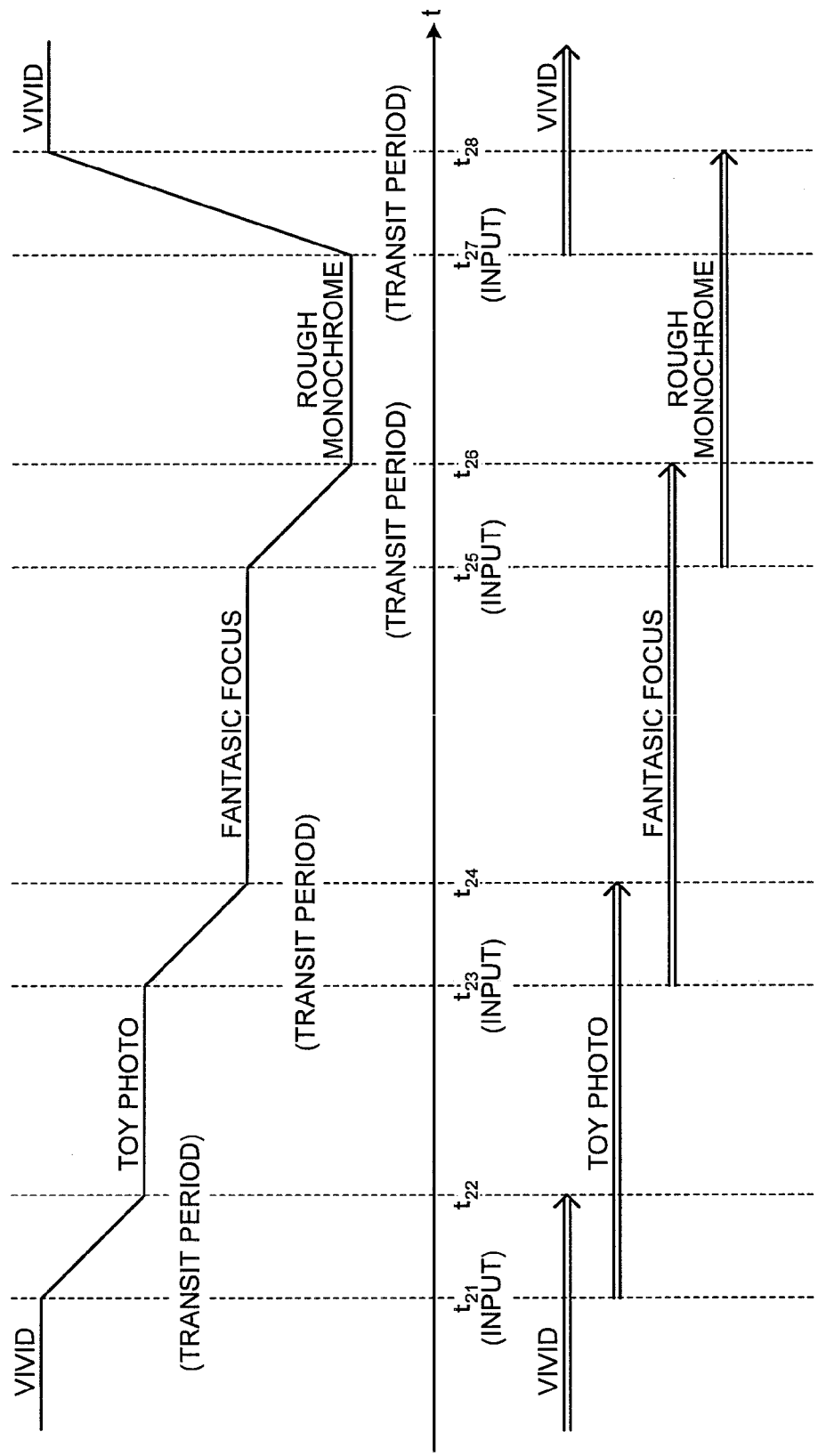
FIG. 14 is a diagram illustrating an outline of processing when the imaging device according to the first embodiment of the present invention is set to a picture bracket mode.

FIG. 14 is a diagram illustrating an outline of processing when the imaging device 1 is set to the picture bracket mode. FIG. 14 illustrates an outline of processing when a picture bracket is set as illustrated in FIG. 13. In this case, when the user inputs the moving image special effect start signal through the moving image special effect start signal input unit 203, the moving image special effect image processing unit 163 starts the transit processing. Here, for example, the function key 48 functions as the moving image special effect start signal input unit 203.

First, when the moving image special effect start signal is input at a time $t_{21}$ in which vivid processing is applied as a finish effect, the artistic effect image processing unit 162 starts toy photo processing, and the moving image special effect image processing unit 163 starts transit processing. Then, when processing is switched to toy photo processing at a time $t_{22}$, vivid processing ends by the basic image processing unit 161.

Figure 15:
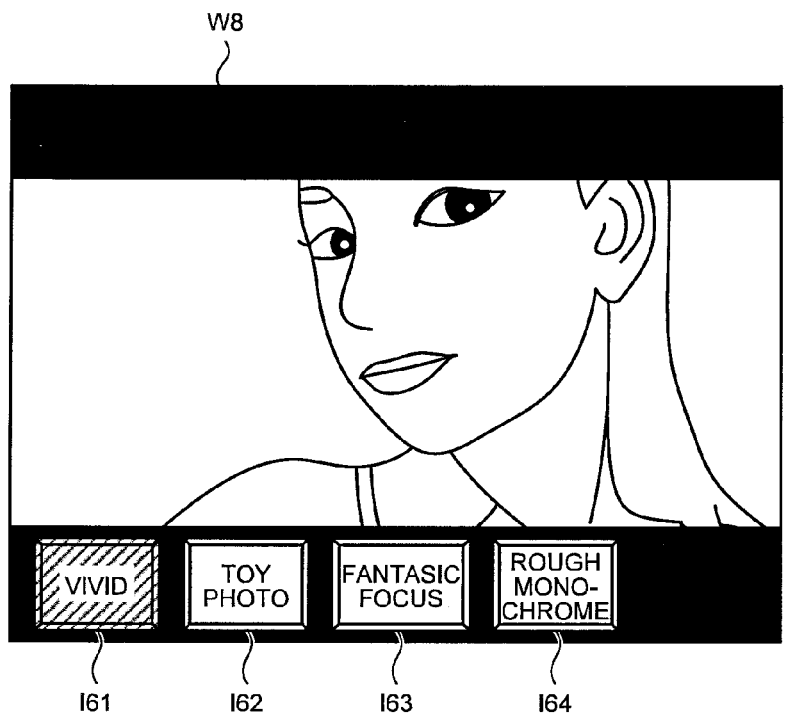
FIG. 15 is a diagram illustrating a screen display example in a display unit in a state in which vivid processing is being executed.

FIG. 15 is a diagram illustrating a screen display example in the display unit 21 in a state in which vivid processing is being executed. Icons representing four effects selected as a picture bracket are displayed on a moving image display screen W8 illustrated in FIG. 15 in selection order from the left (a vivid icon I61, a toy photo icon I62, a fantasic focus icon I63, and a rough monochrome icon I64). Further, an icon (the vivid icon I61) which is currently being processed is highlight-displayed. A selection signal on the icons can be directly input by a contact of a corresponding region through the touch panel 50.

Figure 16:
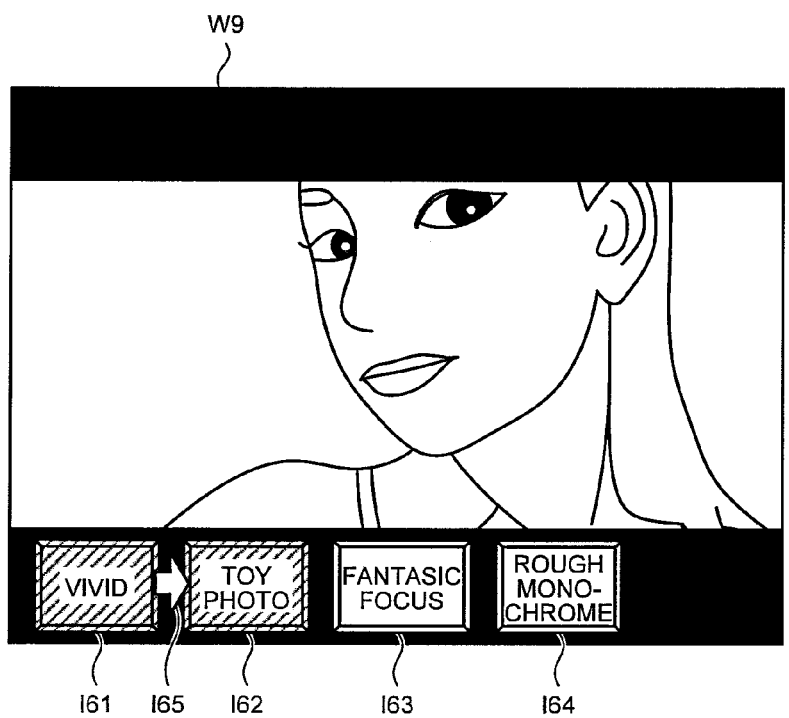
FIG. 16 is a diagram illustrating a screen display example in a display unit directly after a moving image special effect start signal is input in a state illustrated in FIG. 15.

FIG. 16 is a diagram illustrating a screen display example in the display unit 21 directly after the moving image special effect start signal is input in the state illustrated in FIG. 15. In this case, the toy photo processing by the artistic effect image processing unit 162 starts, and transit processing from vivid processing to toy photo processing by the moving image special effect image processing unit 163 starts. Thus, the vivid icon I61 and the toy photo icon I62 are highlight-displayed on the moving image display screen W9, and a right arrow icon I65 representing transit processing is displayed between the two icons. Further, during a transit time period, the display unit 21 may erase a display other than the two icons of the transit target. In addition, during the transit time period, selection of another effect may be invalidated, and when an icon corresponding to another effect is selected, a warning may be offered, and an input may not be received.

As described above, the display unit 21 displays an icon related to a picture bracket using a margin generated when a moving image is displayed. This enables the user to clearly recognize a currently given special effect.

Thereafter, when transit processing has ended and a display has completely transitioned to toy photo processing, the toy photo icon I62 is highlight-displayed.

After transit processing to toy photo processing is completed, when the moving image special effect start signal is input at a time $t_{23}$, the artistic effect image processing unit 162 starts fantasic focus processing, and the moving image special effect image processing unit 163 starts transit processing. Then, when processing is switched to fantasic focus processing at a time $t_{24}$, toy photo processing by the artistic effect image processing unit 162 ends. A display form of an icon in the display unit 21 during the transit time period and transit processing ends are the same as illustrated in FIGS. 15 and 16. In other words, during the transit time period, the toy photo icon I62 and the fantasic focus icon I63 are highlight-displayed, and the arrow icon I65 is displayed between the two icons. Further, after the transit time period ends, only the fantasic focus icon I63 is highlight-displayed.

Thereafter, when the moving image special effect start signal is input at a time $t_{25}$, the artistic effect image processing unit 162 starts rough monochrome processing, and the moving image special effect image processing unit 163 starts transit processing. Then, when processing is switched to rough monochrome processing at a time $t_{26}$, fantasic focus processing by the artistic effect image processing unit 162 ends. In this case, during the transit time period, the fantasic focus icon I63 and the rough monochrome icon I64 are highlight-displayed, and the arrow icon I65 is displayed between the two icons. Further, after the transit time period ends, only the rough monochrome icon I64 is displayed.

Thereafter, when the moving image special effect start signal is input at a time $t_{27}$, since the picture bracket has made one round, the basic image processing unit 161 starts vivid processing, and the moving image special effect image processing unit 163 starts transit processing. Then, when processing is switched to vivid processing at a time $t_{28}$, rough monochrome processing by the artistic effect image processing unit 162 ends. In this case, during the transit time period, the rough monochrome icon I64 and the vivid icon I61 are highlight-displayed. Further, since the rough monochrome icon I64 and the vivid icon I61 are not displayed side by side, the arrow icons I65 are displayed on the right side of the rough monochrome icon I64 and the left side of the vivid icon I61, respectively. Further, after the transit time period ends, only the vivid icon I61 is displayed.

As described above, the imaging device 1 executes transit processing based on the set picture bracket each time the moving image special effect start signal input unit 203 receives an input of the moving image special effect start signal.

The above description has been made in connection with the example in which the user sequentially transits the picture modes set in the picture bracket each time the moving image special effect start signal is pressed. However, for example, when the moving image special effect start signal is pressed once, the picture modes configuring the picture bracket may be sequentially transited in setting order. In this case, the image processing control unit 291 controls the moving image special effect image processing unit 163 such that transit processing is performed at regular intervals.

Further, when the moving image special effect image processing unit 163 is sequentially transiting the picture modes included in the picture bracket, a transit order may be set at the imaging device 1 side such that heavy-load processing is not continuously performed.

In addition, when the moving image special effect image processing unit 163 is sequentially transiting the picture modes included in the picture bracket, the transit order may be changed, for example, in descending order of the frequency of use of the picture mode according to the frequency of use, and then processing may be performed.

Figure 17:
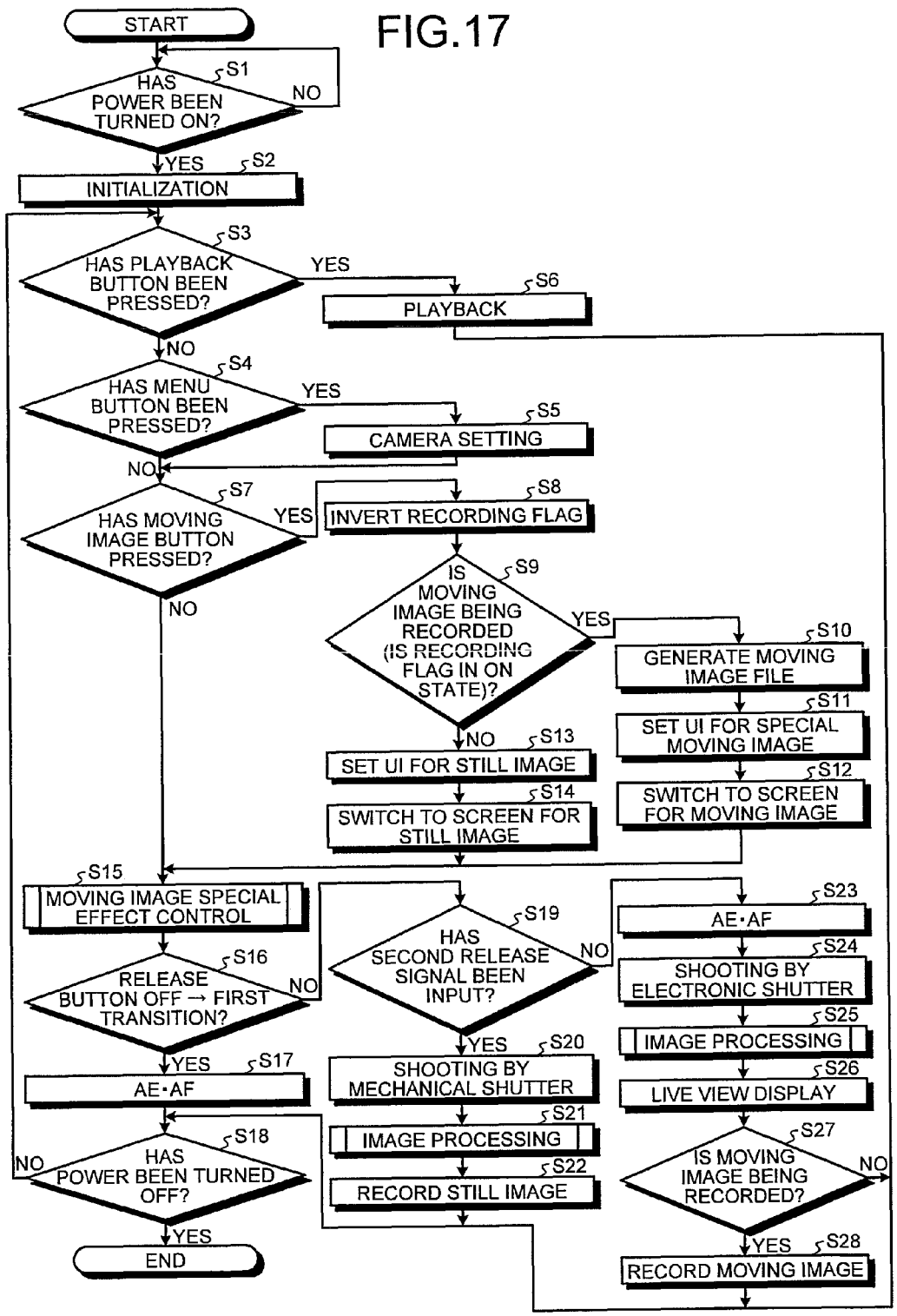
FIG. 17 is a flowchart illustrating an outline of processing performed by the imaging device according to the first embodiment of the present invention.

FIG. 17 is a flowchart illustrating an outline of processing performed by the imaging device 1. Referring to FIG. 17, first, when the user operates the power button 41 to turn power of the imaging device 1 on (Yes in step S1), the control unit 29 initializes the imaging device 1 (step S2). In this initialization processing, for example, the control unit 29 performs processing of resetting a recording flag representing that a moving image is being recorded to an off state, resetting a special effect flag representing the application related to a special effect in a moving image to an off state, and starting lens communication (see FIG. 11) with the lens control unit 38. However, when power of the imaging device 1 is not turned on (No in step S1), the imaging device 1 repeats step S1.

Next, when the playback button 46 is not operated (No in step S3) and the menu button 45 is operated (Yes in step S4), the imaging device 1 displays a display screen used to change a setting, and executes setting processing of setting various kinds of conditions of the imaging device 1 in response to the user's selection operation (step S5). After step S5, the imaging device 1 causes the process to proceed to step S7 which will be described later.

Here, examples of content to be set include finish effect processing, artistic effect processing, a still image recording mode, a moving image recording mode, and moving image special effect processing. Examples of the still image recording mode include a JPEG recording mode, a JPEG+RAW recording mode, and a RAW recording mode depending on the type of still image of a recording target. The moving image capturing mode is a mode decided according to a moving image compression format, and includes, for example, a Motion-JPEG mode and an MP4 (H.264) mode. For example, a switching destination of an artistic effect by transit processing, a fluctuation, and the like are set through the moving image special effect processing.

Here, when the playback button 46 is operated in step S3 (Yes in step S3), the imaging device 1 performs playback processing (step S6). In step S6, the display control unit 292 causes a list of files recorded in the recording medium 23 to be displayed on the display unit 21. Thereafter, when a playback image is selected and input through the input unit 20, image data is acquired from the recording medium 23, the acquired image data is decompressed through the image compressing/decompressing unit 19, and then displayed on the display unit 21. Thereafter, the imaging device 1 causes the process to proceed to step S18.

Here, when the playback button 46 is not operated in step S3 (No in step S3), the menu button 45 is not operated (No in step S4), and the moving image button 47 is operated (Yes in step S7), the control unit 29 inverts the recording flag representing that a moving image is being recorded (step S8). Specifically, for example, when the recording flag is in the on state, the control unit 29 sets the recording flag to the off state.

Next, the control unit 29 determines whether or not the recording flag recorded in the SDRAM 25 is in the on state (step S9). Here, when it is determined that the recording flag is in the on state (Yes in step S9), the control unit 29 generates a moving image file used to record image data in the recording medium 23 in time series and stores the moving image file in the recording medium 23 (step S10).

Thereafter, the control unit 29 sets a user interface (UI) for a special moving image (step S11). Through this setting, for example, an assignment at the time of moving image recording illustrated in FIG. 10 is executed. The control unit 29 recognizes a signal subsequently received by the user interface which is the setting target in step S11 as a signal for a special moving image based on FIG. 10.

Next, the display control unit 292 changes, for example, a setting of an on-screen display (OSD) to be displayed on the display unit 21 and performs switching to a screen for a moving image (step S12). Specifically, for example, the display control unit 292 displays a remaining time, an icon representing that a special effect can be applied during moving image capturing, and the like. Thereafter, the imaging device 1 causes the process to proceed to step S15 which will be described later.

Figure 18:
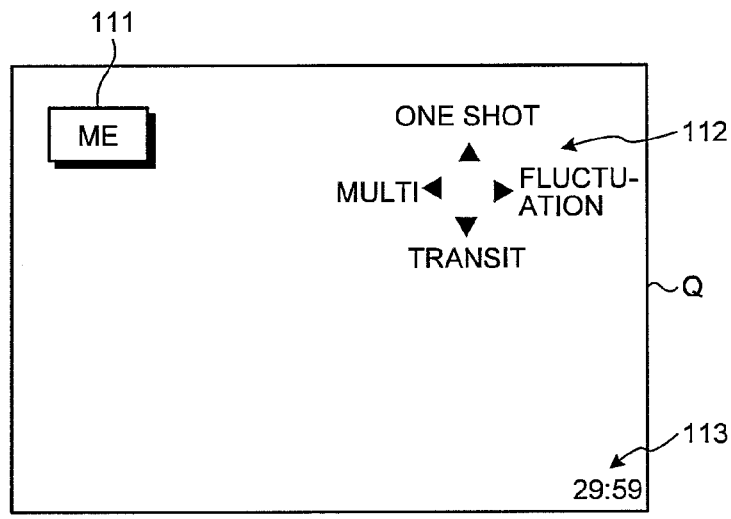
FIG. 18 is a diagram illustrating a screen display example for a moving image in a display unit of the imaging device according to the first embodiment of the present invention.

FIG. 18 is a diagram illustrating a screen display example for a moving image in the display unit 21. As illustrated in FIG. 18, a moving image icon 111 representing that a moving image special effect can be applied, an on screen display 112 representing a screen key assignment for a moving image, and a remaining time 113 displaying a remaining time of moving image capturing are displayed on a screen Q for a moving image. Of these, the on screen display 112 may be displayed for several seconds and then automatically disappeared or may be constantly displayed. Further, the on screen display 112 may be displayed or hidden according to an input from the setting signal input unit 201.

Here, when it is determined in step S9 that the recording flag is in the off state (No in step S9), the control unit 29 sets a user interface for a still image (step S13). Thereafter, the imaging device 1 causes the process to proceed to step S14 which will be described later.

Next, the display control unit 292 switches a setting of the on screen display in the display unit 21 to a setting for a still image (step S14). Through this switching, for example, the display unit 21 displays the number of remaining records, an icon representing that a special effect can be applied during still image capturing, and the like. Thereafter, the imaging device 1 causes the process to proceed to step S15 which will be described later.

Meanwhile, when the moving image button 47 is not operated in step S7 (No in step S7), the image processing control unit 291 causes the moving image special effect image processing unit 163 to perform moving image special effect processing (step S15).

Figure 19:
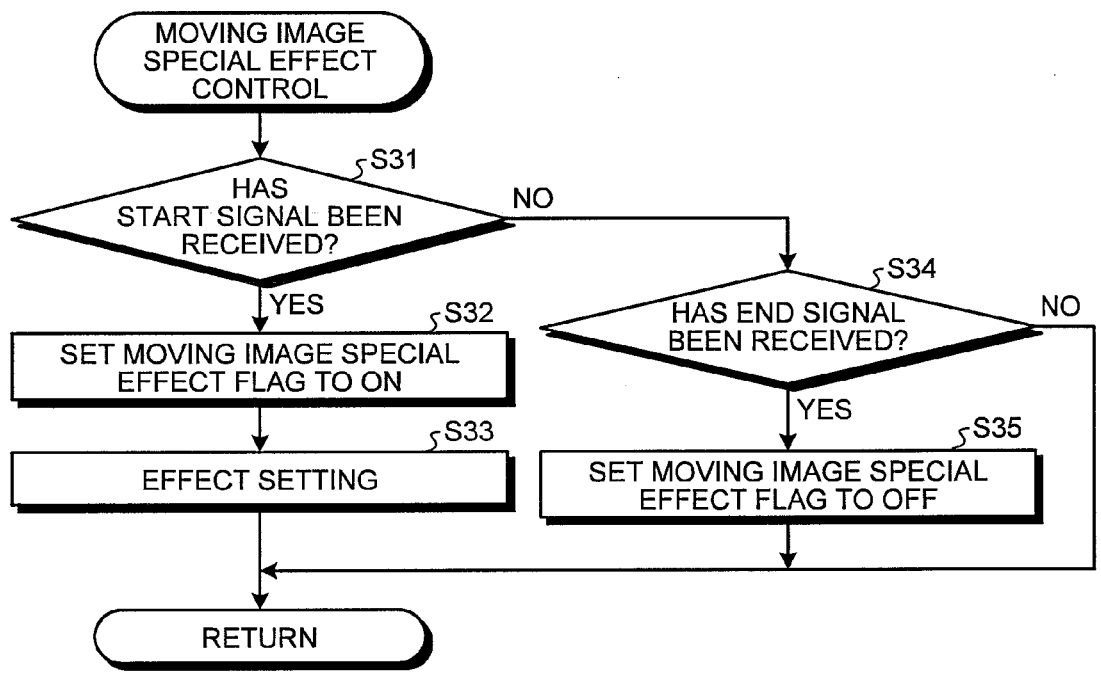
FIG. 19 is a flowchart illustrating an outline of moving image special effect processing performed by the imaging device according to the first embodiment of the present invention.

FIG. 19 is a flowchart illustrating an outline of moving image special effect processing. Referring to FIG. 19, when the moving image special effect start signal input unit 203 receives an input of the moving image special effect start signal (Yes in step S31), the image processing control unit 291 sets a moving image special effect flag to an on state (step S32). Thereafter, the image processing control unit 291 performs effect setting (step S33).

However, when the moving image special effect start signal input unit 203 does not receive an input of the moving image special effect start signal (No in step S31) and an end instruction is input (Yes in step S34), the image processing control unit 291 performs control such that the moving image special effect flag is set to an off state (step S35). Thereafter, the imaging device 1 returns to the main routine. Further, in the case in which transit processing or one-shot echo processing is set as a moving image special effect, when the moving image special effect start signal input unit 203 does not receive an input of the moving image special effect start signal during a predetermined time period, it is preferable that the imaging device 1 input the end instruction by itself.

Meanwhile, when the moving image special effect start signal input unit 203 does not receive an input of the moving image special effect start signal (No in step S31) and the end instruction is not input (No in step S34), the imaging device 1 returns to the main routine.

After moving image special effect processing of step S15, when the first release signal is input from the release button 42 (Yes in step S16), the control unit 29 causes the AE processing unit 17 to execute AE processing of adjusting exposure, and causes the AF processing unit 18 to execute AF processing of adjusting a focus (step S17).

Next, the control unit 29 determines whether or not power of the imaging device 1 has been turned off by an operation on the power button 41 (step S18). Here, when the control unit 29 determines that power of the imaging device 1 has been turned off (Yes in step S18), the imaging device 1 ends the current process. However, when the control unit 29 determines that power of the imaging device 1 has not been turned off (No in step S18), the imaging device 1 causes the process to return to step S3.

Meanwhile, when the first release signal is not input from the release button 42 (No in step S16) and the second release signal is input from the release button 42 (Yes in step S19), the control unit 29 drives the shutter driving unit 11 and the imaging element. driving unit 13 and performs shooting by a mechanical shutter (step S20).

Next, the image processing unit 16 executes predetermined image processing on a captured still image (step S21). The details of image processing will be described later.

Thereafter, the control unit 29 causes image data in a JPEG format through the image compressing/decompressing unit 19, and records the compressed image data in the recording medium 23 (step S22). In step S22, the control unit 29 may record the image data compressed in the JPEG format through the image compressing/decompressing unit 19 in the recording medium 23 in association with RAW data which has not been subjected to image processing by the image processing unit 16. After step S22, the imaging device 1 causes the process to proceed to step S18.

Meanwhile, when the second release signal is not input from the release button 42 in step S19 (No in step S19), the control unit 29 causes the AE processing unit 17 to execute AE processing of adjusting exposure, and causes the AF processing unit 18 to execute AF processing of adjusting a focus (step S23).

Next, the control unit 29 drives the imaging element driving unit 13 and performs shooting by an electronic shutter (step S24).

Thereafter, the image processing unit 16 performs image processing based on setting information of the imaging device 1 (step S25). The details of image processing will be described later.

The display control unit 292 causes live-view image corresponding to the image data processed by the image processing unit 16 to be displayed on the display unit 21 (step S26).

Next, when the imaging device 1 is in the process of moving image recording (Yes in step S27), the control unit 29 compresses image data through the image compressing/decompressing unit 19, and records the compressed image data in a moving image file created in the recording medium 23 as a moving image (step S28). Thereafter, the imaging device 1 causes the process to proceed to step S18. However, when the imaging device 1 is not in the process of moving image recording in step S27 (No in step S27), the imaging device 1 causes the process to proceed to step S18.

Figure 20:
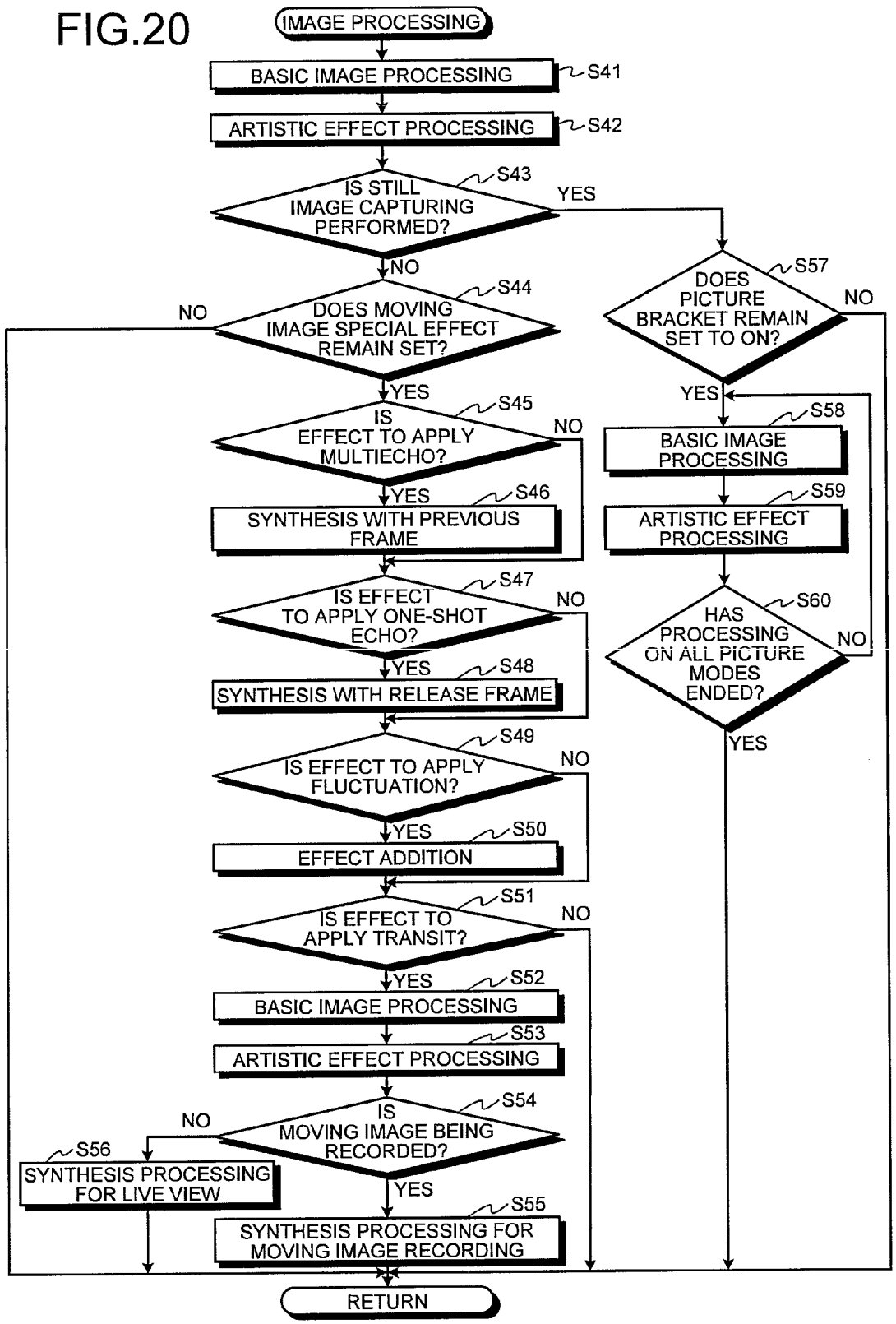
FIG. 20 is a flowchart illustrating an outline of image processing performed by the imaging device according to the first embodiment of the present invention.

FIG. 20 is a flowchart illustrating an outline of image processing. Referring to FIG. 20, the basic image processing unit 161 performs basic image processing (step S41). Here, the basic image processing includes processing such as subtraction of an OB (Optical Black) value, WB correction, synchronization, a color matrix calculation, gamma conversion color correction, edge enhancement, and NR (Noise Reduction).

Here, the WB correction is processing of perform correction by multiplying image data of the Bayer array by an R gain and a B gain corresponding to a WB mode previously set by the user, reads the WB from flash memory from the imaging device main body, and multiplying by the value.

The synchronization is processing of interpolating data not included in a corresponding pixel from the periphery and converting the data into data in which each pixel is configured with RGB data when the imaging element 12 has the Bayer array.

The color matrix calculation is processing of reading a color matrix coefficient corresponding to a set WB mode from the flash memory from the main body and multiplying the color matrix coefficient.

In the gamma conversion color correction processing, a gamma table previously designed according to a finish setting is read from the flash memory of the main body, and image data is subjected to gamma conversion. At this time, gamma conversion applied to RGB data may be performed such that an RGB color space is converted into a color space represented by a brightness signal Y and two color difference signals Cb and Cr, and then gamma conversion is performed only on the brightness signal Y. In addition, in order to obtain appropriate color reproducibility, color correction may be performed using a side parameter previously designed according to a finish setting. A gamma curved line may be changed according to the type of artistic effect.

In edge enhancement processing, enhancement is performed such that an edge component is extracted by a band-pass filter, multiplied by a coefficient corresponding to an edge enhancement level, and added to image data.

In NR processing, processing of reducing noise is performed such that frequency decomposition is performed on an image, and then coring processing is performed according to a frequency.

Next, the artistic effect image processing unit 162 performs artistic effect processing (step S42). Here, processing such as cross filter, soft focus, noise addition, shading, peripheral brightness increase, and peripheral gradation are performed.

Meanwhile, when the imaging device 1 performs moving image capturing (No in step S43), the control unit 29 determines whether or not the moving image special effect remains set (step S44). Here, when the moving image special effect remains set (Yes in step S44), the imaging device 1 causes the process to proceed to step S45. However, when the moving image special effect does not remain set (No in step S44), the imaging device 1 returns to the main routine.

Here, in a state in which it is determined in step S44 that the moving image special effect remains set (Yes in step S44), when an effect to apply is the multiecho (Yes in step S45), the moving image special effect image processing unit 163 performs multiecho processing (see FIG. 4) such that an immediately previous image processing result (previous frame) is synthesized with a current frame at a predetermined ratio (step S46). However, when a special effect to apply is not the multiecho (No in step S45), the imaging device 1 causes the process to proceed to step S47.

In step S47, the control unit 29 determines whether or not an effect to apply is the one-shot echo. Here, when an effect to apply is the one-shot echo (Yes in step S47), the moving image special effect image processing unit 163 performs synthesis processing on a release frame which is specific image data stored in the SDRAM 25 in order to obtain a one-shot echo effect (step S48). Here, in case of a first frame after the special effect flag is set to the on state, the moving image special effect image processing unit 163 performs processing of storing an image of a current frame in the SDRAM 25. However, in case of a second or later frame after the special effect flag is set to the on state, the moving image special effect image processing unit 163 performs synthesis processing of synthesizing a corresponding frame with the release frame stored in the SDRAM 25.

Meanwhile, when it is determined in step S47 that a moving image special effect to apply is not a one-shot echo (No in step S47), the imaging device 1 causes the process to proceed to step S49.

In step S49, the control unit 29 determines whether or not an effect to apply is the fluctuation. Here, when an effect to apply is the fluctuation (Yes in step S49), the moving image special effect image processing unit 163 performs processing of adding a fluctuation effect (step S50).

Here, concrete processing of the moving image special effect image processing unit 163 in step S50 will be described. The moving image special effect image processing unit 163 adds an effect of applying fluctuation to an image processing parameter in artistic effect processing such as shading processing and cross filter processing. For example, in case of shading processing, an attenuation characteristic from the center of an image is changed over time. In case of peripheral gradation, a gradation amount or a gradation shape is changed. In case of cross filter, the length or angle of a cross pattern is changed over time. Further, chroma, contrast, or white balance may be changed over time. Further, when the fluctuation overlaps an artistic effect such shading, both may be applied, or only fluctuation may be applied.

Meanwhile, when it is determined in step S49 that an effect to apply is not the fluctuation (No in step S49), the imaging device 1 causes the process to proceed to step S51.

In step S51, the control unit 29 determines whether or not an effect to apply is the transit (step S51). Here, when an effect to apply is the transit (Yes in step S51), the basic image processing unit 161 and the artistic effect image processing unit 162 execute basic image processing and artistic effect processing according to a finish/switching destination setting, respectively, (steps S52 and S53).

Thereafter, when the imaging device 1 is in the process of moving image recording (Yes in step S54), the moving image special effect image processing unit 163 generates a transit image by performing synthesis processing for moving image recording on two images of the transit target (step S55).

However, when the imaging device 1 is not in the process of moving image recording (No in step S54), the moving image special effect image processing unit 163 generates a transit image by performing synthesis processing for live-view display on two images of the transit target (step S56). The difference between synthesis processing for moving image recording and synthesis processing for live-view display in step S56 is the difference in a temporal change of the coefficient b (see FIG. 8).

After step S55 or step S56, the imaging device 1 returns to the main routine.

Meanwhile, when the control unit 29 determines step S51 that an effect to apply is not the transit (No in step S51), the imaging device 1 returns to the main routine.

Here, the case in which it is determined in step S43 that the imaging device 1 performs still image capturing (Yes in step S43) will be described. In this case, when the picture bracket remains set (Yes in step S57), the basic image processing unit 161 performs basic image processing (step S58), and the artistic effect image processing unit 162 performs artistic effect processing (step S59).

Thereafter, when basic image processing and artistic effect processing corresponding to all the picture modes included in the picture bracket have ended (Yes in step S60), the imaging device 1 returns to the main routine. However, when basic image processing and artistic effect processing corresponding to all the picture modes included in the picture bracket have not ended (No in step S60), the imaging device 1 returns to step S58.

Here, when the picture bracket remains off (No in step S57), the imaging device 1 returns to the main routine.

According to the first embodiment of the present invention described above, switching of artistic effect processing is performed according to an input of the moving image special effect start signal, and thus a special effect can be easily switched at the user's desired timing during moving image capturing.

In addition, according to the first embodiment, switching to a previously set artistic effect is performed at the user's intended timing by a single button. Thus, it is possible to capture a moving image in which the user's intension is reflected without undergoing an editing work. Generally, imaging devices are smaller in memory capacity and processing capability than personal computers (PCs), and thus it is difficult to implement moving image data editing processing equivalently of PCs or the like. Further, in an imaging device capable of performing still image capturing during moving image capturing or performing still image capturing directly after moving image capturing ends, a memory shortage or a memory management problem is decisive, and there may occur a problem in that the cost increase due to memory addition, responsiveness during still image capturing is lowered, and a still image quality deteriorates. In this regard, in the first embodiment, implemented is a technique capable of capturing a moving image in which a photographer's shooting intension is reflected through a special effect of a temporal change over a plurality of frames at the time of shooting without editing a captured moving image.

Further, according to the first embodiment, the picture bracket is implemented through the user interface, and thus the user can recognize the transit function as an extension of the picture bracket from a still image to moving image. Further, the user interface allowing artistic effect switching during moving image capturing can be provided with natural operability.

In addition, according to the first embodiment, the user interface configuring a setting signal input unit can be provided with both an input function for a moving image and an input function for a still image. Thus, the user interface having excellent operability even during moving image capturing can be implemented. Furthermore, since the number of user interfaces can be controlled, a limitation to the layout can be reduced, and an imaging device suitable for miniaturization can be implemented.

Modified Example 1-1

Figure 21:
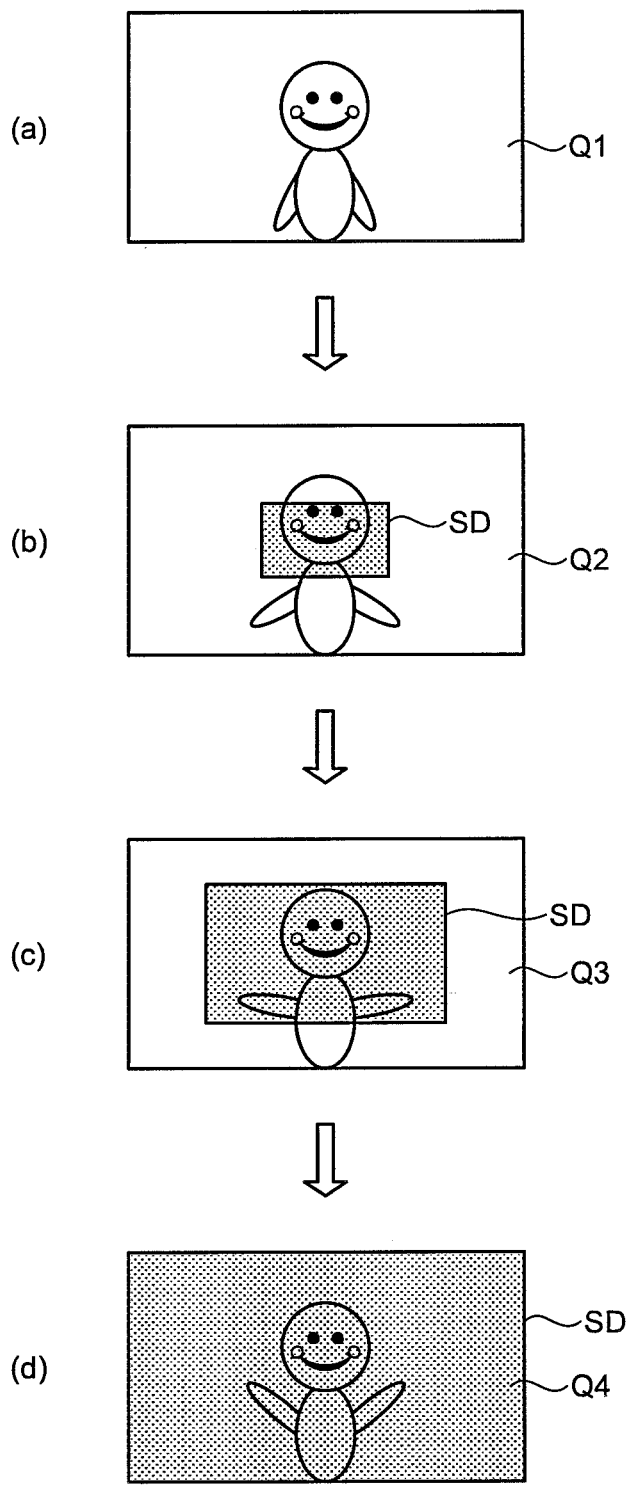
FIG. 21 is a diagram illustrating a screen display example of a display unit in transit processing at the time of picture bracket setting performed by an imaging device according to Modified example 1-1 of the first embodiment of the present invention.

FIG. 21 is a diagram illustrating a screen display example of the display unit 21 in transit processing at the time of picture bracket setting performed by an imaging device according to Modified example 1-1 of the first embodiment. In Modified example 1-1, the moving image special effect image processing unit 163 does not mix the two picture modes at a predetermined ratio as in the above-described embodiment and instead performs processing of steadily reducing a ratio of a portion which has been subjected to image processing corresponding to a picture mode before transit processing on an entire screen.

In a screen Q1 illustrated in FIG. 21(a), a picture mode (referred to as a "picture mode C") before transit processing is performed on an entire screen. Thereafter, as in a screen Q2 illustrated in FIG. 21(b), a region SD which has been subjected to a picture mode (referred to as a "picture mode D") of a transit destination is displayed on a screen central portion. Then, as a time elapses, as in a screen Q3 illustrated in FIG. 21(c), the area size of the region SD which has been subjected to the picture mode D increases, and the area which has been subjected to the picture mode C decreases. Then, when transit processing by the moving image special effect image processing unit 163 is completed, a state in which the picture mode D has been performed on the entire screen is displayed as in a screen Q4 illustrated in FIG. 21(d).

In Modified example 1-1, the area which has been subjected to the picture mode of the transit destination may be displayed by another method. For example, a display may be made such that the area which has been subjected to the picture mode of the transit destination steadily increases from the right end or the left end of the screen. Further, a display may be made such that the area which has been subjected to the picture mode of the transit destination appears steadily along a circumference from a straight line connecting the center of the screen with a point on an outer edge.

Modified Example 1-2

Figure 22:
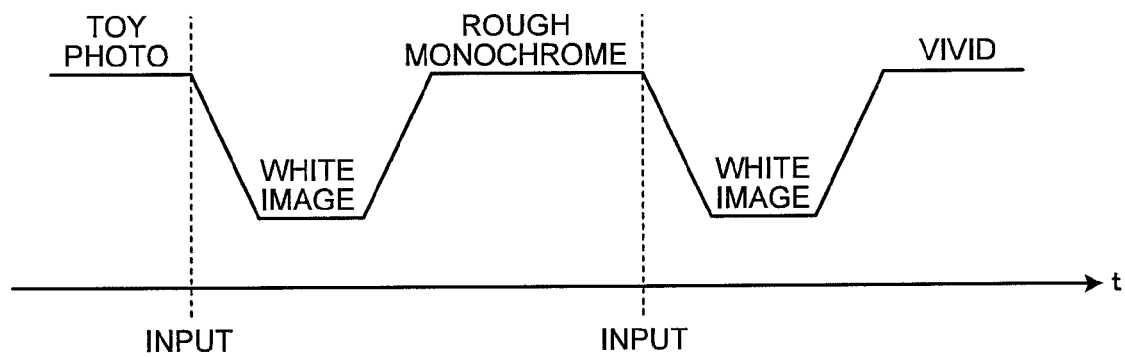
FIG. 22 is a diagram illustrating an outline of transit processing at the time of picture bracket setting performed by an imaging device according to Modified example 1-2 of the first embodiment of the present invention.

FIG. 22 is a diagram illustrating an outline of transit processing at the time of picture bracket setting performed by an imaging device according to Modified example 1-2 of the first embodiment. As illustrated in FIG. 22, in Modified example 1-2, when the moving image special effect start signal input unit 203 receives an input of the moving image special effect start signal, the moving image special effect image processing unit 163 inserts a pure white image (a white image) in the process of transit processing.

Further, in Modified example 1-2, for example, a pure black image or any other monochromatic image may be used as an image to be inserted in the process of transit processing instead of a white image.

Modified Example 1-3

In Modified example 1-3 of the first embodiment, an application form of the moving image special effect is switched through the touch panel 50, and particularly, when a transit effect is selected, the picture bracket can be selected.

Figure 23:
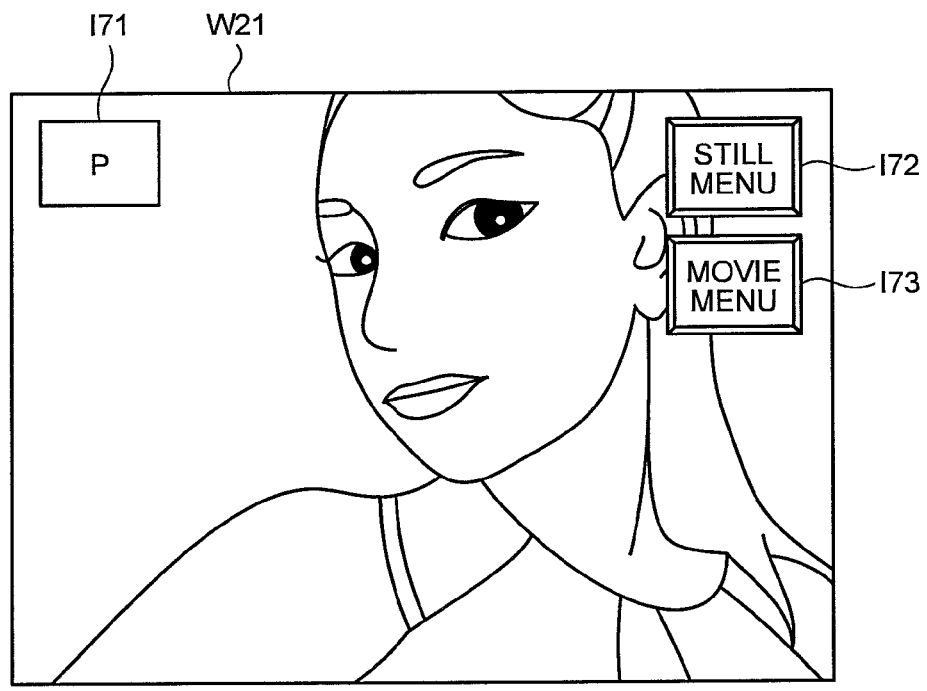
FIG. 23 is a diagram illustrating a screen display example in a display unit when an imaging device according to Modified example 1-3 of the first embodiment of the present invention is in a still image capturing standby state.

FIG. 23 is a diagram illustrating a screen display example in the display unit 21 when an imaging device according to Modified example 1-3 of the first embodiment is in a still image capturing standby state. A shooting mode icon I71 (displayed as "P") is displayed on the upper left of a screen W21. Further, a still image capturing menu selection icon I72 (displayed as "STILL MENU") and a moving image capturing menu selection icon I73 (displayed as "MOVIE MENU") are displayed on the upper right of the screen W21.

Here, when the menu selection icon I72 is selected in a state in which the screen W21 is displayed, the display control unit 292 causes an icon used to select each of white balance, AF, and photometry and an icon used to return to an original operation display screen to be displayed on the display unit 21 as a still image capturing menu (not illustrated).

Figure 24:
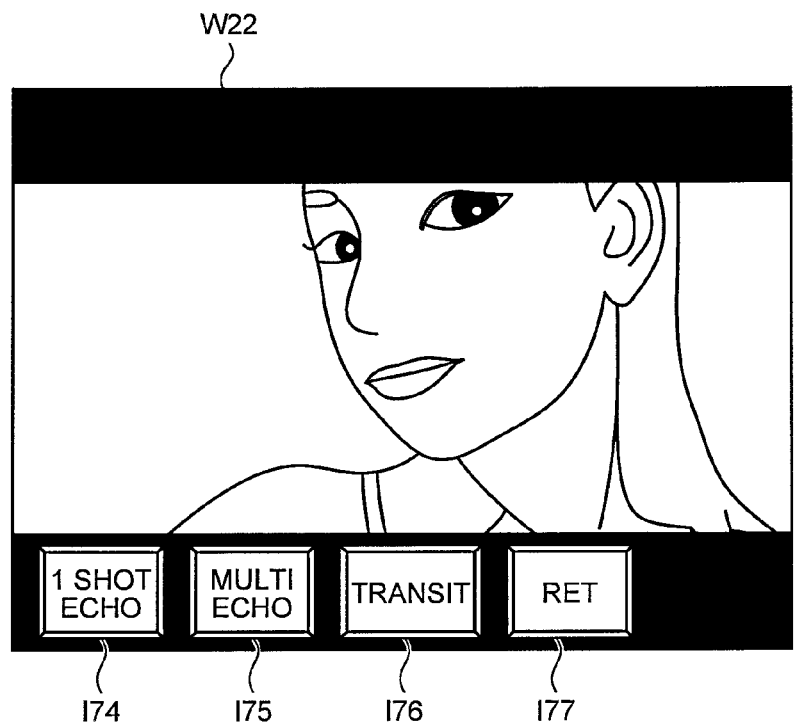
FIG. 24 is a diagram illustrating a screen display example in a display unit when an imaging device according to Modified example 1-3 of the first embodiment of the present invention is in the moving image capturing standby state.

However, when the menu selection icon I73 is selected in a state in which the screen W21 is displayed, the display control unit 292 causes an image representing a moving image capturing standby state to be displayed on the display unit 21. FIG. 24 is a diagram illustrating a screen display example in the display unit 21 when an imaging device according to Modified example 1-3 is in the moving image capturing standby state. Four types of icons including a one-shot echo icon I74 (displayed as "1Shot Echo"), a multiecho icon I75 (displayed as "Multi Echo"), a transit icon I76 (displayed as a "Transit"), and a return icon I77 (displayed as "RET") are displayed on a screen W22 illustrated in FIG. 24 through the display unit 21.

In the moving image capturing standby state illustrated in FIG. 24, an aspect ratio of an image at the time of still image capturing is changed, and so an image that is more rectangular than a still image is displayed. For this reason, the display unit 21 displays various kinds of icons on a non-display area of an image that is of a rectangular band shape in a vertical direction of a screen.

Among icons displayed on the screen W22, the one-shot echo icon I74, the multiecho icon I75, and the transit icon I76 are icons used to select the one-shot echo, the multiecho, and the transit as the moving image special effect, respectively. Here, when any one icon is selected, the display unit 21 displays a live-view image in which the selected moving image special effect has been rendered.

The return icon I77 is an icon used to return to an immediately previous image display.

Figure 25:
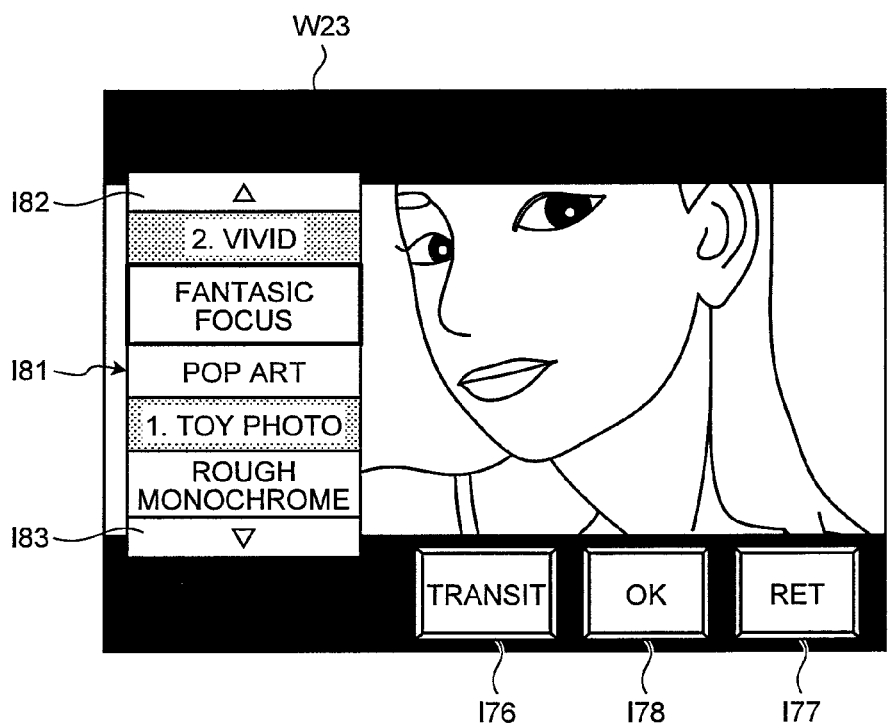
FIG. 25 is a diagram illustrating a screen display example in a display unit when a transit is selected as a moving image special effect in the imaging device according to Modified example 1-3 of the first embodiment of the present invention.

FIG. 25 is a diagram illustrating a screen display example in the display unit 21 when the transit is selected as the moving image special effect in a state in which the screen W22 is displayed on the display unit 21. The transit icon I76, a decision icon I78 (displayed as "OK"), and the return icon I77 are displayed on a lower portion of a screen W23 illustrated in FIG. 25 through the display unit 21. Further, a switching destination effect list display icon I81 displaying a transit switching destination effect list is selectably displayed on a left portion of the screen through the display unit 21. A display order of items in the switching destination effect list display icon I81 can be appropriately changed.

An up-scroll button I82 used to receive an input of an upward scroll signal and a down-scroll button I83 used to receive an input of a downward scroll signal are disposed on upper and lower ends of the switching destination effect list display icon I81, respectively. For example, when the up-scroll button I82 is selected, a display is scrolled upward, an item "Vivid" displayed on the top disappears, an item "fantasic focus" is displayed on the top, and another finish item is displayed on the bottom.

FIG. 25 illustrates an example in which in the switching destination effect list display icon I81, "1. Toy photo" and "2. Vivid" are sequentially selected and highlight-displayed, and the fantasic focus currently becomes active (is displayed in a thick frame). Here, when selection of the picture bracket is completed, the user selects the decision icon I78 (displayed as "OK"). Thereafter, the display control unit 292 erases the switching destination effect list display icon I81. Thereafter, the image processing control unit 291 causes the moving image special effect image processing unit 163 to start transit processing.

Second Embodiment

An imaging device according to a second embodiment of the present invention is configured such that a function by which a moving image special effect is displayed through a live-view display, the user confirms a desired effect, and then shooting is performed in a state in which a special effect is applied is added to the imaging device of the first embodiment.

Figure 26:
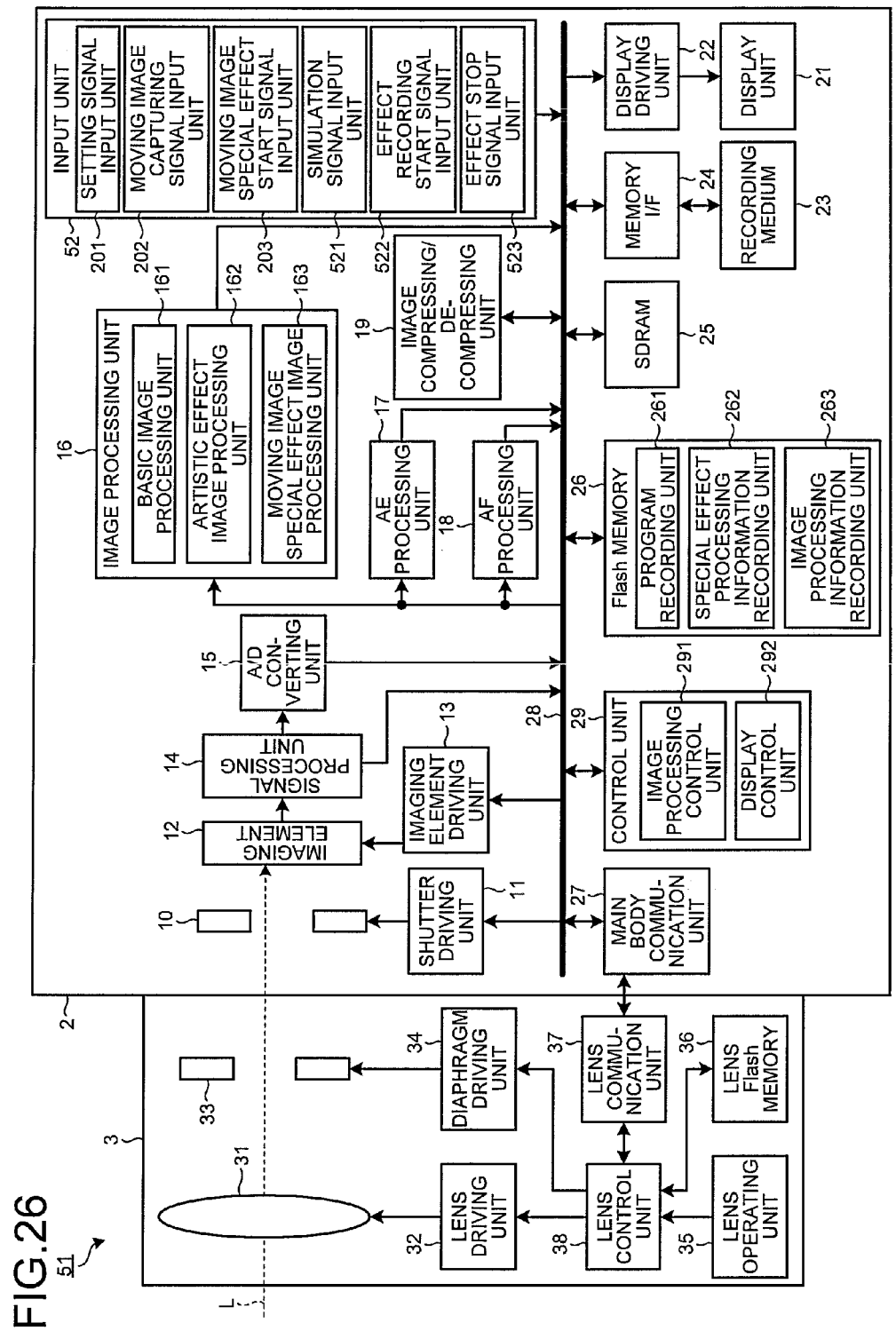
FIG. 26 is a block diagram illustrating a configuration of an imaging device according to a second embodiment.

FIG. 26 is a block diagram illustrating a configuration of an imaging device according to the second embodiment. An imaging device 51 illustrated in FIG. 26 has the same configuration as the imaging device 1 described in the first embodiment except for an input unit 52. A configuration of the input unit 52 will be described below.

The input unit 52 includes a simulation signal input unit 521, an effect recording start signal input unit 522, and an effect stop signal input unit 523 in addition to the setting signal input unit 201, the moving image capturing signal input unit 202, and the moving image special effect start signal input unit 203.

The simulation signal input unit 521 receives an input of a simulation signal used to apply a moving image special effect only to a live-view display. The effect recording start signal input unit 522 receives an input of an effect recording start signal used to record an image to which the moving image special effect is applied in the SDRAM 25 and the recording medium 23. The effect stop signal input unit 523 receives an input of an effect stop signal used to stop a moving image special effect applied to recording to a live-view display and an image.

FIG. 27 is a diagram illustrating an assignment of a user interface in the imaging device 51. First, an assignment at the time of moving image non-recording will be described. In this case, the exposure correction operation is assigned to the up-arrow key 443 of the cross key 441. The continuous shooting/single shooting operation is assigned to the down-arrow key 444. The AF target operation is assigned to the left-arrow key 445. The flash setting operation is assigned to the right-arrow key 446. In addition, at the time of moving image non-recording, a camera setting operation is assigned to the decision button 442, an AE/AF operation is assigned to a first release operation, and a shooting operation is assigned to a second release operation.

Next, an assignment at the time of moving image recording will be described. In this case, an effect simulation start operation is assigned to the up-arrow key 443. Thus, the up-arrow key 443 serves as a part of the simulation signal input unit 521.

An effect stop operation is assigned to the down-arrow key 444. Thus, the down-arrow key 444 serves as a part of the effect stop signal input unit 523. Among the moving image special effects, the multiecho and the fluctuation need a stop instruction.

An effect switching operation is assigned to the left-arrow key 445 and the right-arrow key 446.

An effect recording start function is assigned to the decision button 442, and the first release operation and the second release operation of the release button 42. Thus, the decision button 442 and the release button 42 serve as a part of the effect recording start signal input unit 522.

FIG. 28 is a diagram illustrating an outline of a state transition of the imaging device 51 at the time of moving image recording. Here, when the simulation signal is input through the simulation signal input unit 521 in a state (a state I) in which a moving image special effect does not remain set to a live-view display and a moving image recording display after moving image recording starts, the image processing control unit 291 transitions to a state II in which control is performed such that a moving image special effect is applied to a live-view display, and a moving image special effect is not applied during moving image recording.

Here, when the simulation signal is input and then the imaging device 1 executes the transit of the picture bracket, the image processing control unit 291 may cause the moving image special effect image processing unit 163 to execute transit processing with the same processing content as at the time of moving image recording. In other words, a change in the coefficient b is controlled to follow the curved line L1 illustrated in FIG. 8. Through this operation, the user can check a transit effect at the time of moving image recording on the screen.

Then, when the effect recording start signal is input through the effect recording start signal input unit 522 in the state II, the image processing control unit 291 starts to apply a moving image special effect even to an image to be recorded in the SDRAM 25 as well as a live-view display (a state III).

Then, when the effect stop signal is input the effect stop signal input unit 523 in the state III, the image processing control unit 291 stops applying a moving image special effect to a live-view display and moving image recording. This causes the imaging device 1 to transit to the state I.

According to the second embodiment of the present invention described above, since the imaging device includes the simulation signal input unit, the effect start signal input unit, and the effect stop signal input unit, the user can apply a special effect as a trial before recording a moving image and check the effect on the screen. Thus, the user can easily shoot a more creative moving image to which an effect expected at an intended timing is applied.

Further, in the second embodiment, recording of an image to which a moving image special effect is applied starts at a point in time at which an input of the effect recording start signal is received. However, when another operation is not made until a predetermined time elapses after an input of the simulation signal is received, recording of an image to which a moving image special effect is applied may automatically start.

Other Embodiments

The embodiments for embodying the present invention have been described so far, but the present invention is not limited to the first and second embodiments.

For example, in the present invention, an electronic view finder may be disposed in the main body separately from a display unit, and the present invention may be applied to the electronic view finder. In this case, it is preferable that the display unit and the electronic view finder differ from each other in a method of viewing a moving image special effect.

Further, in the present invention, the lens unit may be formed integrally with the main body.

In addition, the imaging device according to the present invention can be applied to electronic devices such as digital cameras with an accessory mounted thereto, digital video cameras, portable phones with a shooting function, and tablet type portable devices as well as digital single-lens reflex cameras.

Furthermore, in the description of the flowchart in this disclosure, a sequence relation of processing between steps is specified using an expression such as "first," "thereafter," and "next." However, a sequence of processing necessary to embody the present invention is not uniquely decided. In other words, a sequence of processing in a flowchart described in this disclosure may be changed within a consistent range.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging device that captures a subject, generates image data of the subject, and captures a moving image and a still image, the device comprising:
   an image processing unit that executes artistic effect processing of applying an artistic effect causing a visual effect to the image data by a combination of a plurality of image processing, and executes moving image special effect processing of applying a moving image special effect causing a visual effect over a plurality of frames;
   a moving image special effect start signal input unit that receives an input of a moving image special effect start signal instructing a start of the moving image special effect processing in the image processing unit;
   an image processing control unit that switches artistic effect processing to be executed by the image processing unit in response to the input of the moving image special effect start signal when a plurality of kinds of processing remain set as artistic effect processing performed by the image processing unit;
   a display unit that displays the image data; and
   a storage unit that stores information including the image data,
   wherein the image processing control unit increases a time necessary to switch the artistic effect processing when the imaging device is in the process of storing image data of a moving image in the storage unit larger than when the imaging device is in the process of performing a live-view display on the image data through the display unit.

2. The imaging device according to claim 1,
   wherein the image processing unit executes the plurality of kinds of artistic effect processing when the imaging device performs still image capturing in a state in which a plurality of kinds of processing remain set as artistic effect processing performed by the image processing unit.

3. An imaging device that captures a subject, generates image data of the subject, and captures a moving image and a still image, the device comprising:
   an image processing unit that executes artistic effect processing of applying an artistic effect causing a visual effect to the image data by a combination of a plurality of image processing, and executes moving image special effect processing of applying a moving image special effect causing a visual effect over a plurality of frames;
   a moving image special effect start signal input unit that receives an input of a moving image special effect start signal instructing a start of the moving image special effect processing in the image processing unit; and
   an image processing control unit that switches artistic effect processing to be executed by the image processing unit in response to the input of the moving image special effect start signal when a plurality of kinds of processing remain set as artistic effect processing performed by the image processing unit,
   wherein the image processing unit performs finish effect processing causing a finish effect corresponding to a previously set shooting condition and generates finish image data, and
   the image processing control unit performs switching of artistic effect processing and finish effect processing executed by the image processing unit in response to an input of the moving image special effect start signal when a plurality of kinds of processing remain set as the artistic effect processing and the finish effect processing collectively.

4. The imaging device according to claim 3, further comprising:
   a setting signal input unit that receives an input of a plurality of setting signals used to set processing content of the artistic effect processing and the finish effect processing,
   the image processing control unit performs switching of the artistic effect and the finish effect processing according to an input order of the plurality of setting signals input by the setting signal input unit.

5. An imaging method performed by an imaging device that captures a subject, generates image data of the subject, and captures a moving image and a still image, the method comprising:
   in a state in which a plurality of kinds of processing remain set as artistic effect processing causing a visual effect by a combination of a plurality of imaging processing, when an input of a moving image special effect start signal used to start moving image special effect processing applying a moving image special effect causing a visual effect over a plurality of frames is input during execution of any one of the plurality of kinds of artistic effect processing, switching artistic effect processing which is being executed to another artistic effect processing included in the plurality of kinds of processing;
   displaying the image data;
   storing information including the image data; and
   increasing a time necessary to switch the artistic effect processing when the imaging device is in the process of storing image data of a moving image in the storage unit larger than when the imaging device is in the process of performing a live-view display on the image data.

6. A non-transitory computer-readable recording medium recording an executable program, the program instructing a processor to execute:
- in a state in which a plurality of kinds of processing remain set as artistic effect processing causing a visual effect by a combination of a plurality of imaging processing, when an input of a moving image special effect start signal used to start moving image special effect processing applying a moving image special effect causing a visual effect over a plurality of frames is input during execution of any one of the plurality of kinds of artistic effect processing, switching artistic effect processing which is being executed to another artistic effect processing included in the plurality of kinds of processing;
- displaying the image data; and
- storing information including the image data; and
- increasing a time necessary to switch the artistic effect processing when the imaging device is in the process of storing image data of a moving image in the storage unit larger than when the imaging device is in the process of performing a live-view display on the image data.

\* \* \* \* \*